(12) United States Patent
Hull et al.

(10) Patent No.: US 7,328,245 B1
(45) Date of Patent: *Feb. 5, 2008

(54) REMOTE RETRIEVAL OF DOCUMENTS

(75) Inventors: Jonathan J Hull, San Carlos, CA (US); Derek E Poppink, Mountain View, CA (US)

(73) Assignee: Ricoh Co., Ltd., Tokyo (JP)

( * ) Notice: Subject to any disclaimer, the term of this patent is extended or adjusted under 35 U.S.C. 154(b) by 519 days.

This patent is subject to a terminal disclaimer.

(21) Appl. No.: 10/163,542

(22) Filed: Jun. 5, 2002

Related U.S. Application Data

(63) Continuation-in-part of application No. 10/046,447, filed on Oct. 29, 2001.

(60) Provisional application No. 60/322,518, filed on Sep. 14, 2001.

(51) Int. Cl.
G06F 15/16 (2006.01)

(52) U.S. Cl. .................... 709/206; 709/219

(58) Field of Classification Search ............. 709/206, 709/204, 200–203, 217–227
See application file for complete search history.

(56) References Cited

U.S. PATENT DOCUMENTS

| 5,809,167 | A |   | 9/1998  | Al-Hussein |
|-----------|---|---|---------|------------|
| 5,826,269 | A | * | 10/1998 | Hussey ................ 707/10 |
| 5,844,969 | A |   | 12/1998 | Goldman et al. |
| 5,859,971 | A |   | 1/1999  | Bittinger et al. |
| 5,905,777 | A |   | 5/1999  | Foladare et al. |
| 5,911,776 | A | * | 6/1999  | Guck ................ 709/217 |
| 5,978,837 | A |   | 11/1999 | Foladare et al. |
| 6,160,631 | A | * | 12/2000 | Okimoto et al. ......... 358/1.15 |
| 6,173,322 | B1 |  | 1/2001  | Hu |
| 6,236,768 | B1 |  | 5/2001  | Rhodes et al. |
| 6,256,666 | B1 |  | 7/2001  | Singhal |
| 6,327,590 | B1 |  | 12/2001 | Chidlovskii et al. |
| 6,397,228 | B1 |  | 5/2002  | Lamburt et al. |
| 6,449,637 | B1 | * | 9/2002 | Toga ................... 709/206 |
| 6,487,278 | B1 | * | 11/2002 | Skladman et al. ....... 379/88.13 |

(Continued)

OTHER PUBLICATIONS

Wood, Dave. "Programming Internet Emai". Sebastopol, Calif. O'Reily and Associates, 1999. pp. 38-40 and 46-57.*

(Continued)

*Primary Examiner*—Moustafa Meky
(74) *Attorney, Agent, or Firm*—Fenwick & West LLP

(57) ABSTRACT

A method, system, computer program product, and user interface for enabling secure, remote selection and retrieval of stored electronic documents from a user's PC or other device. The user may obtain such access to his or her documents from any network-connected location, regardless of whether a firewall is present. A directory representation of the user's PC hard drive is transmitted to the user at his or her remote location. The user can navigate within the directory representation to select a document for retrieval. An e-mail message is transmitted from the user's remote location to the PC that causes the selected document to be packaged as an attachment and transmitted to the remote location. In one application of the invention, a user can print a document from his or her PC, while he or she is standing at a printer (or multifunction device) that is not in the same physical location as the PC. The PC responds to a user request received from the printer by e-mailing the document as a print-ready attachment. Upon receipt of the e-mail, the printer prints the document.

62 Claims, 15 Drawing Sheets

U.S. PATENT DOCUMENTS

| | | | |
|---|---|---|---|
| 6,505,237 B2 | 1/2003 | Beyda et al. | |
| 6,670,968 B1 | 12/2003 | Schilit et al. | |
| 6,697,942 B1* | 2/2004 | L'Heureux et al. | 713/152 |
| 6,714,968 B1* | 3/2004 | Prust | 709/219 |
| 6,741,855 B1 | 5/2004 | Martin et al. | |
| 6,801,935 B2* | 10/2004 | Shen | 709/219 |
| 6,859,832 B1 | 2/2005 | Gecht et al. | |
| 6,876,462 B2 | 4/2005 | Okada et al. | |
| 6,952,724 B2* | 10/2005 | Prust | 709/219 |
| 6,993,527 B1 | 1/2006 | Raman et al. | |
| 7,000,001 B2 | 2/2006 | Lazaridis | |
| 7,047,242 B1 | 5/2006 | Ponte | |
| 7,075,669 B2 | 7/2006 | Reddy | |
| 7,080,099 B2 | 7/2006 | Tada et al. | |
| 7,110,998 B1 | 9/2006 | Bhandari et al. | |
| 7,203,725 B1 | 4/2007 | Gilmour et al. | |
| 2001/0013029 A1 | 8/2001 | Gilmour | |
| 2001/0042032 A1 | 11/2001 | Crawshaw et al. | |
| 2002/0019851 A1* | 2/2002 | Pollack | 709/206 |
| 2002/0042838 A1 | 4/2002 | Tabayoyon et al. | |
| 2002/0073076 A1 | 6/2002 | Xu et al. | |
| 2002/0191210 A1* | 12/2002 | Staas et al. | 358/1.15 |
| 2002/0194307 A1* | 12/2002 | Anderson et al. | 709/219 |
| 2003/0028587 A1* | 2/2003 | Driscoll et al. | 709/203 |
| 2003/0069877 A1 | 4/2003 | Grefenstette et al. | |
| 2003/0187951 A1* | 10/2003 | Shen | 709/219 |
| 2004/0019643 A1* | 1/2004 | Zirnstein, Jr. | 709/206 |
| 2004/0088318 A1 | 5/2004 | Brady | |
| 2004/0177159 A1* | 9/2004 | Butterfield et al. | 709/246 |

OTHER PUBLICATIONS

Marsan, C. D., "Printing to get 'Net Facelift," [online]. NetworkWorldFusion, Jul. 10, 2000 [retrieved on Sep. 19, 2002]. 4 Pages. Retrieved from the Internet: <URL: http://www.nwfusion.com/cgi-bin/mailto/x.cgi>. (Copy enclosed.).

PrintMe Networks web pages [online]. PrintMe Networks [retrieved on Sep. 19, 2002]. 18 Pages. Retrieved from the Internet: <URL: https://www.printme.com/>. (Copy enclosed.).

* cited by examiner

REMOTE RETRIEVAL OF DOCUMENTS

CROSS-REFERENCE TO RELATED APPLICATIONS

The present application is a continuation-in-part of U.S. patent application Ser. No. 10/046,447 for "Asynchronous Unconscious Retrieval in a Network of Information Appliances," filed Oct. 29, 2001, the disclosure of which is incorporated herein by reference.

BACKGROUND OF THE INVENTION

1. Field of the Invention

The present invention is related to document retrieval, and more particularly to securely and remotely selecting and retrieving electronic documents from a device such as a personal computer.

2. Description of the Background Art

It is often the case that a user wishes to remotely access a file from a personal computer (PC) or other device. For example, a user may have a PC at his or her office, and may wish to access a file on the PC while he or she is at another location (such as at home, or at a client, or traveling). The user may wish to view or print a file, or to edit it, or to perform some other operation. Even if the user has access to a network-connected computer or other device, and even if the PC that contains the information is powered up and network-connected at the time the user wishes to access it, there is generally no easy way for the user to remotely select and retrieve a document from the PC without having anticipated such a need beforehand and performing relatively burdensome setup operations. For example, a user may set up his or her PC to act as a network server, thus making the contents (or a subset of the contents) of the PC's hard drive available over a network; however, such a solution is cumbersome and difficult for most users, and may also introduce significant security risks.

In addition, many companies have installed network firewalls to guard against unauthorized access to network-connected resources; such firewalls generally block remote access to the devices within the network (including users' PCs). In cases where such a firewall is in place, users generally cannot remotely access files on their PCs without deactivating or reconfiguring the firewall.

In order to address this problem, users may copy all their data to a portable machine such as a laptop computer or a personal digital assistant (PDA). Then, the user may carry the portable machine containing all the files, wherever the user goes, so as to ensure that the user can access the files whenever needed. However, such a technique imposes significant overhead, is burdensome in that it requires the user to continually keep the portable documents updated, and can result in errors if the portable versions of documents fall out of sync with the versions stored on the non-portable PC (for example, if the stored documents are modified after they have been copied onto the portable device). Furthermore, the portable machine may be lost, stolen, or damaged during travel, potentially resulting in data loss and/or unauthorized access to the user's data by anyone who steals or finds the device. Finally, such a technique requires that the user anticipate his or her document needs, which is not always feasible or possible.

A related problem is that a user in an office environment may wish to print a document while he or she is standing at a printer that may be located in a different room than the user's PC. Conventionally, there is no way for a user to select, retrieve, and print a document from his or her office PC, via an interface at a centrally located printer. Rather, the user must return to his or her own PC, select the document, and activate the print function to send the document to the printer. The user must then return again to the printer to retrieve the hard copy of his or her document.

What is needed is a technique for allowing a user to remotely and securely select and access files on his or her PC, from virtually any network-connected location. What is further needed is a technique that allows such remote access even when a firewall is in place. What is further needed is a technique that allows a user to select and print a document from his or her PC, while he or she is standing at a printer (or other device) that is not in the same physical location as the PC.

SUMMARY OF THE INVENTION

The present invention enables secure, remote selection and retrieval of stored electronic documents from a user's PC (or other device). The user may obtain such access to his or her documents from any network-connected location, regardless of whether a firewall is present.

The present invention provides remote access as follows. A directory representation of the user's PC hard drive is transmitted to the user at his or her remote location. The user can navigate within the directory representation to select a file for retrieval. An e-mail message is transmitted from the user's remote location to the PC that causes the selected document to be packaged as an attachment and transmitted to the remote location. In one embodiment, the transmission of the directory representation, the document request, and the retrieved document are all implemented as e-mail messages; thus, the transmissions can take place even if a firewall is present. In one embodiment, the system employs a one-time pad technique to authenticate the user and to block unauthorized access to documents. E-mail messages for transmitting requests, directory information, and documents may be encrypted so as to ensure that the information contained therein remains confidential.

The user's PC can be pre-configured to respond to authenticated document requests received from the user. In one embodiment, the PC automatically responds to such requests by transmitting an e-mail containing the requested document as an attachment. Depending on the type of access requested, the document can be provided in any desired format; for example, if the user is interested in printing the document, the PC transmits a print-ready version of the document, such as a portable document format (PDF) or PostScript file.

In one application of the invention, a user can print a document from his or her PC, while he or she is standing at a printer (or multifunction device) that is not in the same physical location as the PC. The printer includes an interface that allows the user to authenticate himself or herself, and to identify the PC from which the document is to be retrieved. The printer sends a request to the PC, and receives a directory representation of the PC via e-mail. The user navigates through the directory representation using the interface provided at the printer. The user selects the document to be printed. The printer then transmits an e-mail request to the PC, identifying the document and the type of access desired (print format). The PC responds automatically by e-mailing the document as a print-ready attachment. Upon receipt of the e-mail, the printer prints the document. All of these steps take place in seconds, while the user is standing at the printer. Thus, the user can select and print documents while standing at the printer, and without having to return to his or her PC. Such functionality can even be implemented at a printer shop (such as Kinko's), so that a user could walk into the printer shop, retrieve a document on his or her home PC, and print the document on the printer at the printer shop using the functionality of the present invention.

The present invention thus allows remote selection and retrieval of documents from a user's PC, without compromising security and without requiring the user to set up and configure a server on his or her PC. In addition, the invention is able to operate in virtually any network-connected environment, even if a firewall is present. Finally, the invention avoids the limitations and disadvantages of prior art schemes for remotely accessing files and documents.

Figure 1:
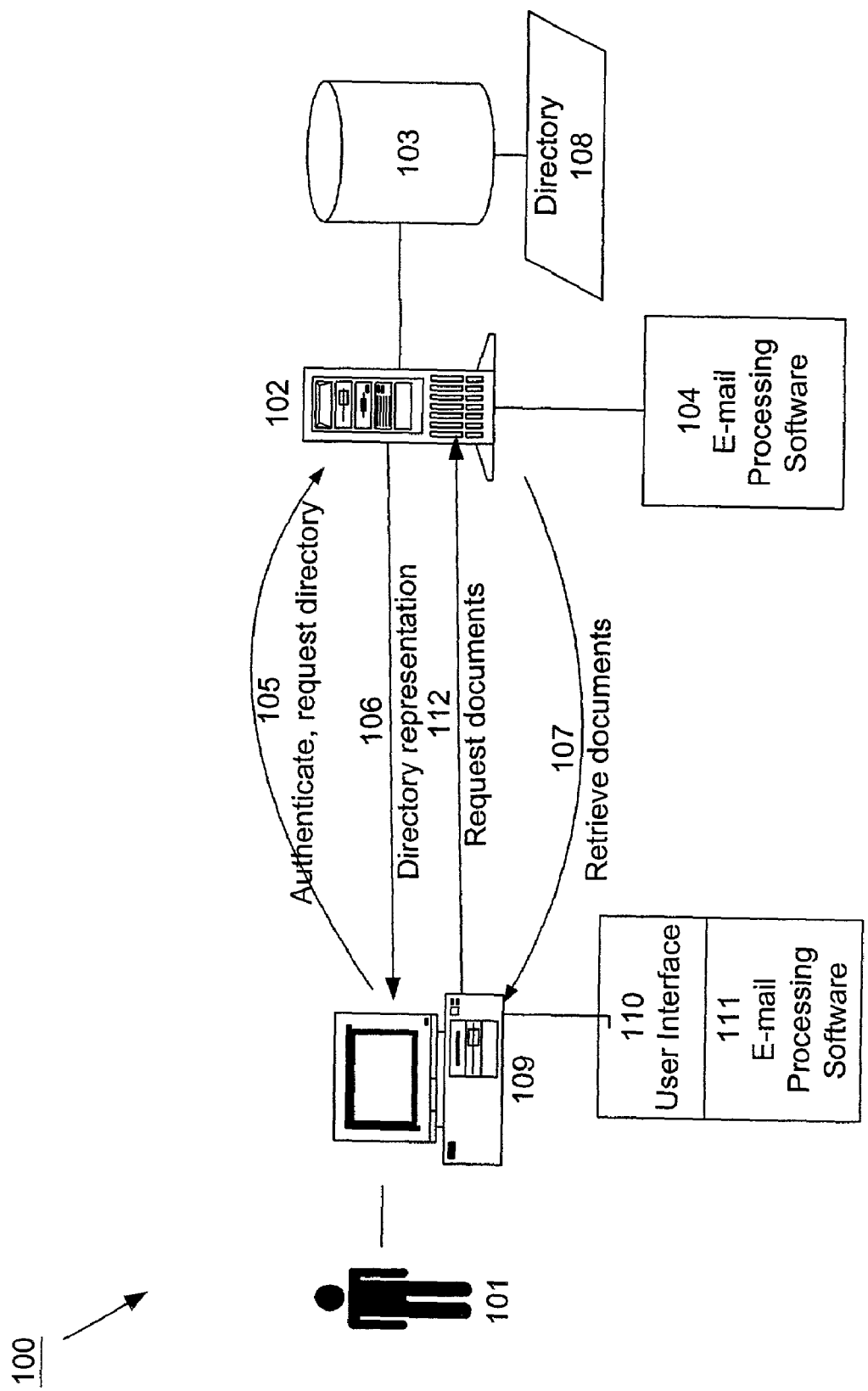
FIG. 1 is a block diagram depicting a system for remote retrieval according to the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system. Such an information system as claimed may be the entire workflow system as detailed below in the preferred embodiment or only portions of such a system. For example, the present invention can operate with an information system that need only be a browser in the simplest sense to present and display objects. Thus, the present invention is capable of operating with any information system from those with minimal functionality to those providing all the functionality disclosed herein.

System

Figure 10:
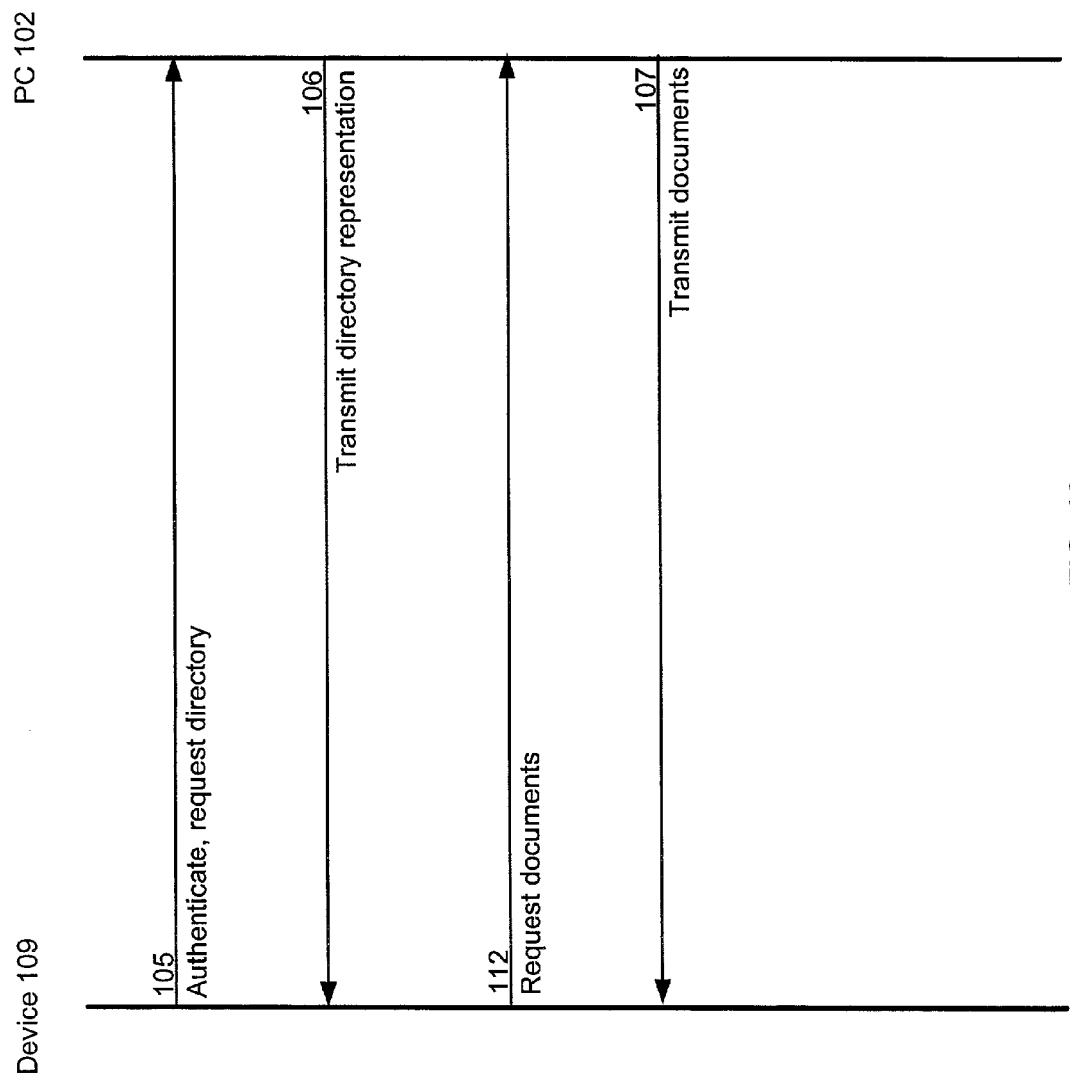
FIG. 10 is an event trace diagram depicting a series of steps for remote retrieval of documents according to one embodiment of the present invention.

Referring now to FIG. 1, there is shown a block diagram depicting a system 100 for remote retrieval of documents according to one embodiment of the present invention. Referring also to FIG. 10, there is shown an event trace diagram depicting a series of steps for remote retrieval of documents according to one embodiment of the present invention. User 101 interacts with device 109, which may be a remote computer, printer, fax machine, multifunction device, PDA, or any other device. PC 102 is a computer from which user 101 wishes to retrieve a document, either for printing, viewing, editing, or the like. Presumably, PC 102 is the user's own computer, located at his or her home or office, although PC 102 may be any computer, document storage appliance, server, or the like, which user 101 is authorized to access.

Device 109 and PC 102 may each be implemented as conventional personal computers, comprising a central processing unit, input and output device, and memory (not shown). In addition, PC 102 includes or is connected to a document storage device 103, such as a hard drive, that contains documents organized according to a directory 108, as is known in the art. In one embodiment, device 109 and PC 102 each run an operating system such as Microsoft Windows XP® or Unix, including a graphical user interface for providing control functions and file management functions. Device 109 and PC 102 may also have other functionality and may run additional applications, such as for example word processing, e-mail, spreadsheet, and web browser applications.

It is understood that device 109 and PC 102 are both connected to a network (not shown), such as the Internet, or a local area network (LAN) or wide area network (WAN), or the like, using known protocols and techniques for network communication and infrastructure. Accordingly, device 109 and PC 102 each include hardware and software for establishing and maintaining network connections using standard network protocols such as TCP/IP, HTTP, and SMTP as are known in the art. The present invention may be implemented on virtually any type of computer network, although for purposes of clarity the following description assumes that the network is capable of supporting and transmitting e-mail messages from one node to another.

In one embodiment, the functionality of the present invention is implemented as two software components. A device component, including user interface 110 and e-mail processing software 111, runs on device 109, and provides user interface capabilities and automatic e-mail generation capabilities. A PC component, comprising e-mail processing software 104, runs at PC 102 and responds to requests from device 109. These software components may be preinstalled as part of an operating system installation, or may be installed at any time.

User 101 initiates a command on device 109 that requests a directory of documents from PC 102. Device 109 generates and sends an e-mail message 105 to PC 102. The e-mail message contains authentication information and a request for the directory data. In one embodiment, the user's request is transmitted to PC 102 using a one-time pad or other secure method. As is known in the art, a one-time pad is a system in which a randomly generated private key is used only once to encrypt a message that is then decrypted by the receiver using a matching one-time pad and key.

PC 102 is configured to automatically process and respond to incoming e-mail messages that contain requests for directories and/or documents. In one embodiment, PC 102 is preconfigured with e-mail processing software 104 that contains instructions for responding to such requests. In another embodiment, the operating system of PC 102 includes functionality for dealing with such requests.

The present invention can be implemented using any PC 102 having some kind of functionality for receiving and sending e-mail (or some other transport mechanism). The particulars of PC's 102 network connectivity are irrelevant to the invention; thus, PC 102 may be connected via a T1 line, digital subscriber line (DSL), cable modem, dial-up connection, or the like. In one embodiment, PC 102 is on and connected constantly. In an alternative embodiment, PC 102 may be configured to periodically turn itself on, and/or to check and service e-mail messages from devices 109 as described herein. Alternatively, a mail server (not shown) can be configured to turn on PC 102 when it receives e-mail.

PC 102 receives e-mail message 105 and authenticates the user. One skilled in the art will recognize that such authentication may be performed using any known means, including for example password authentication, biometric authentication, or the like. Once the user has been authenticated, PC 102 transmits, via e-mail, a representation 106 of directory 108 to device 109. Representation 106 may include the entire directory 108, or a subset of directory 108, depending on the nature of the request and depending on how PC 102 has been configured to make documents available in this manner. For example, user 101 may configure PC 102 to only make certain files or subdirectories available via the techniques of the present invention. Those areas of directory 108 that are configured to be off-limits may be omitted from representation 106, or may be included in representation 106 but indicated as inaccessible (using a distinctive color, or icon, or some other designation).

In one embodiment, representation 106 contains meta-information for each document. Such meta-information may include, for example, the date of creation, date of last modification, author, application and version used in creating the document, size, and the like. Representation 106 may also contain document summaries, thumbnail images, or other abridged representations of documents that can assist a user in discerning the contents of documents without having access to the complete originals.

Device 109 presents representation 106 to user 101. In one embodiment, device 109 provides a user interface that permits navigation throughout the displayed representation 106. Thus, user 101 can look through the various documents, view meta-information, thumbnails, summaries, and the like, and select one or more documents he or wishes to retrieve. In another embodiment, device 109 provides a search mechanism that allows a user to enter keywords and/or parameters for meta-information, so as to more easily identify the document(s) of interest. For example, the user may search for documents having a certain combination of keywords and having a creation date that falls within a specified range. User interfaces for providing such search functionality are well known in the art, and are often included in file management functionality in conventional operating systems such as Microsoft Windows XP or the like. In the present invention, according to one embodiment, user 101 can use any desired combination of search functionality and directory navigation to locate and identify the document(s) of interest.

Once the desired document(s) have been identified, device 109 transmits e-mail message 112 to PC 102 requesting one or more documents. E-mail message 112 specifies the document(s) requested by user 101, and may also specify a desired format (for example, a print-ready format such as a PDF or Post-Script file if device 109 is a printer). In response to the message, PC 102 retrieves the identified document(s) from storage 103, converts the retrieved document(s) to an appropriate format (if needed), encrypts the document(s), and transmits an e-mail message 107 to device 109 including the encrypted document(s) as an attachment. E-mail encryption and transport is accomplished, in one embodiment, using a product such as Encryption Plus E-mail Enterprise, an e-mail plug-in available from PC Guardian of San Rafael, Calif., and described at www.pc-guardian.com. One skilled in the art will recognize that any other e-mail encryption software can be used.

Upon receipt of e-mail message 107, device 109 decrypts the attached document(s) and performs the operation requested by user 101. For example, if the user requested that the retrieved document(s) be printed, device 109 prints them.

One skilled in the art will recognize that other transmission techniques besides e-mail messages can be used to send document retrieval request 105, directory information 106, and retrieved documents 107. E-mail messages are advantageous because they may be sent between device 109 and PC 102 even if a firewall is present; however, in alternative embodiments other transmission techniques may be used.

In an alternative embodiment, e-mail message 105 may contain more complex queries for directory information, or may contain any command that can be run at PC 102 for generating a list of documents or files. For example, message 105 may include search parameters (such as keywords, file types, locations, and the like) for a document search on files stored in storage device 103. Upon receipt of message 105 and authentication of the user, PC 102 runs the requested search. PC 102 transmits the results of the requested search back to device 109, in a similar manner as representation 106 is transmitted in FIG. 1. The requested search may extend to all files stored on device 103, or some subset thereof, or it may include other resources that are accessible by device 102 or device 109. Thus, the results of the search or other command may include documents that are located on other servers, computers, databases, bulletin boards, or devices; search results would then include full path information to enable device 109 to locate and retrieve documents from these other resources, either directory or via a network connection. In one embodiment, search results are provided as Uniform Resource Locators (URLs) so as to facilitate access to the referenced documents via an Internet connection.

Figure 8:
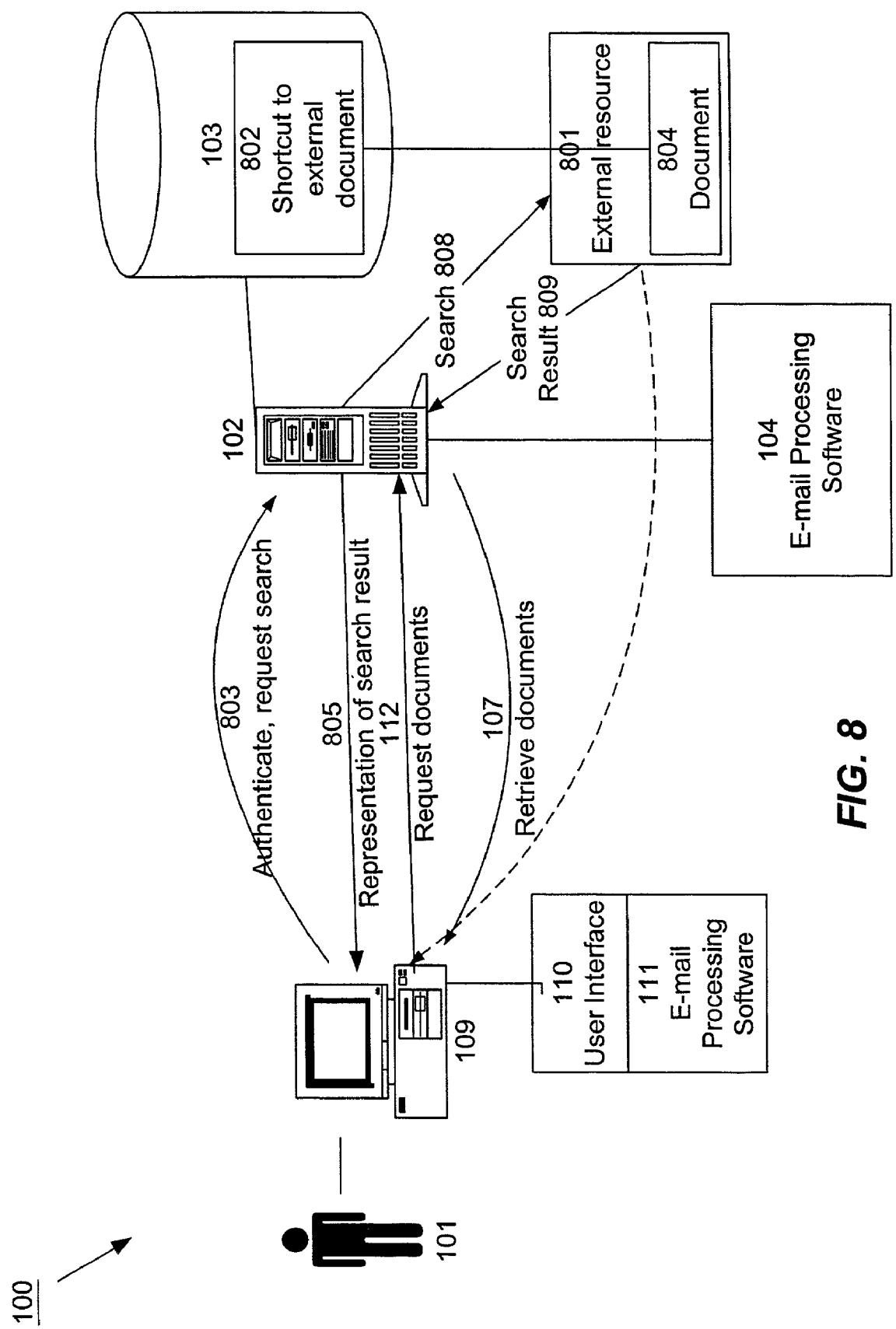
FIG. 8 is a block diagram depicting a system for remote retrieval from an external resource according to the present invention.
Figure 11:
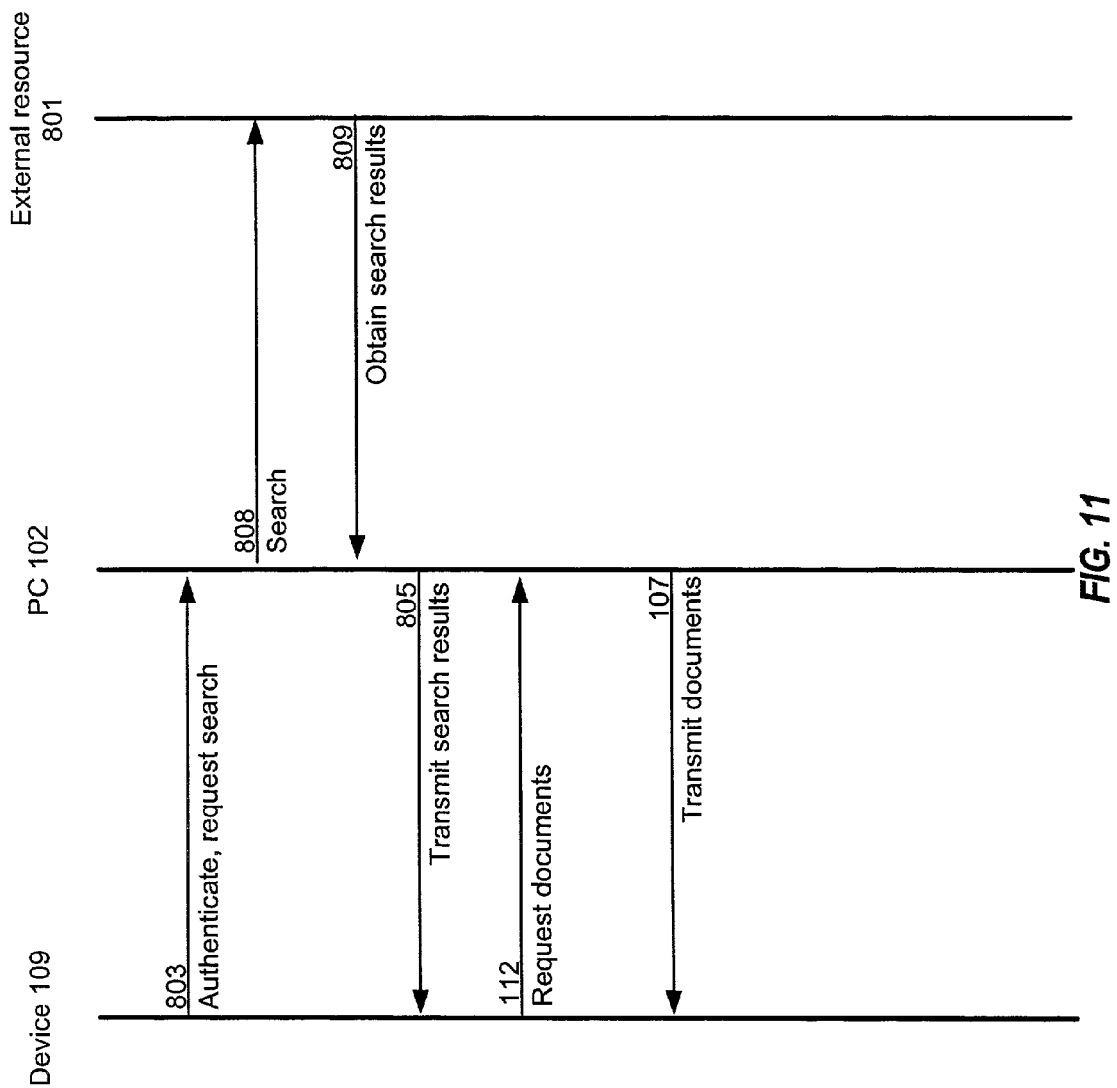
FIG. 11 is an event trace diagram depicting a series of steps for remote retrieval from an external resource according to the present invention.

Referring now to FIG. 8, there is shown a block diagram depicting a variation of system 100 wherein, in response to a search request 803 (or some other command that requests a list of documents), PC 102 performs search 808 and obtains search result 809. Referring also to FIG. 11, there is shown an event trace diagram depicting a series of steps for the variation shown in FIG. 8. Search result 809 provides the location of various documents on external resource 801, including for example document 804. External resource 801 may be a server, computer, database, bulletin board, or other device or data structure. PC 102 stores, on device 103, a shortcut 802 that contains path information that points to the actual location of document 804 on external resource 801.

When responding to search request 803, PC 102 includes shortcut 802 in representation of results 805 that is provided to device 109 in the same manner as directory representation 106 of FIG. 1. Device 109 can thereby request document 804 as though it resided on PC 102. Upon receipt of a request for document 804, device 109 uses shortcut 802 to retrieve the document from external resource 801. In response to a request for document 801, PC 102 may retrieve document 801 and transmit it to requesting device 109, or PC 102 may direct external resource 801 to transmit document 804 directly to device 109. Such direction may be effected via a command transmitted by e-mail, or by some other means.

Figure 2:
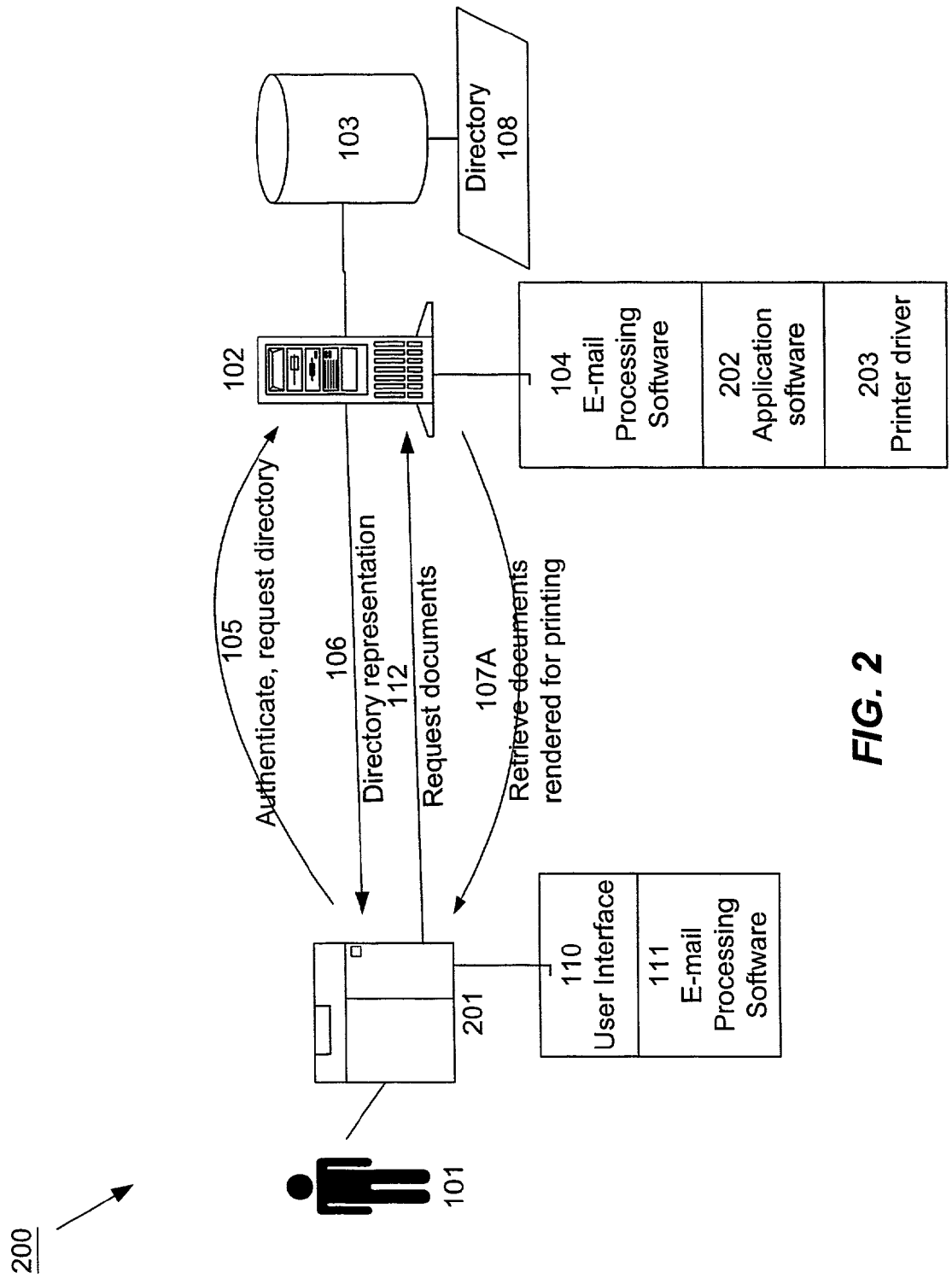
FIG. 2 is a block diagram depicting a system for remote retrieval as implemented using a printer or multifunction device according to the present invention.
Figure 12:
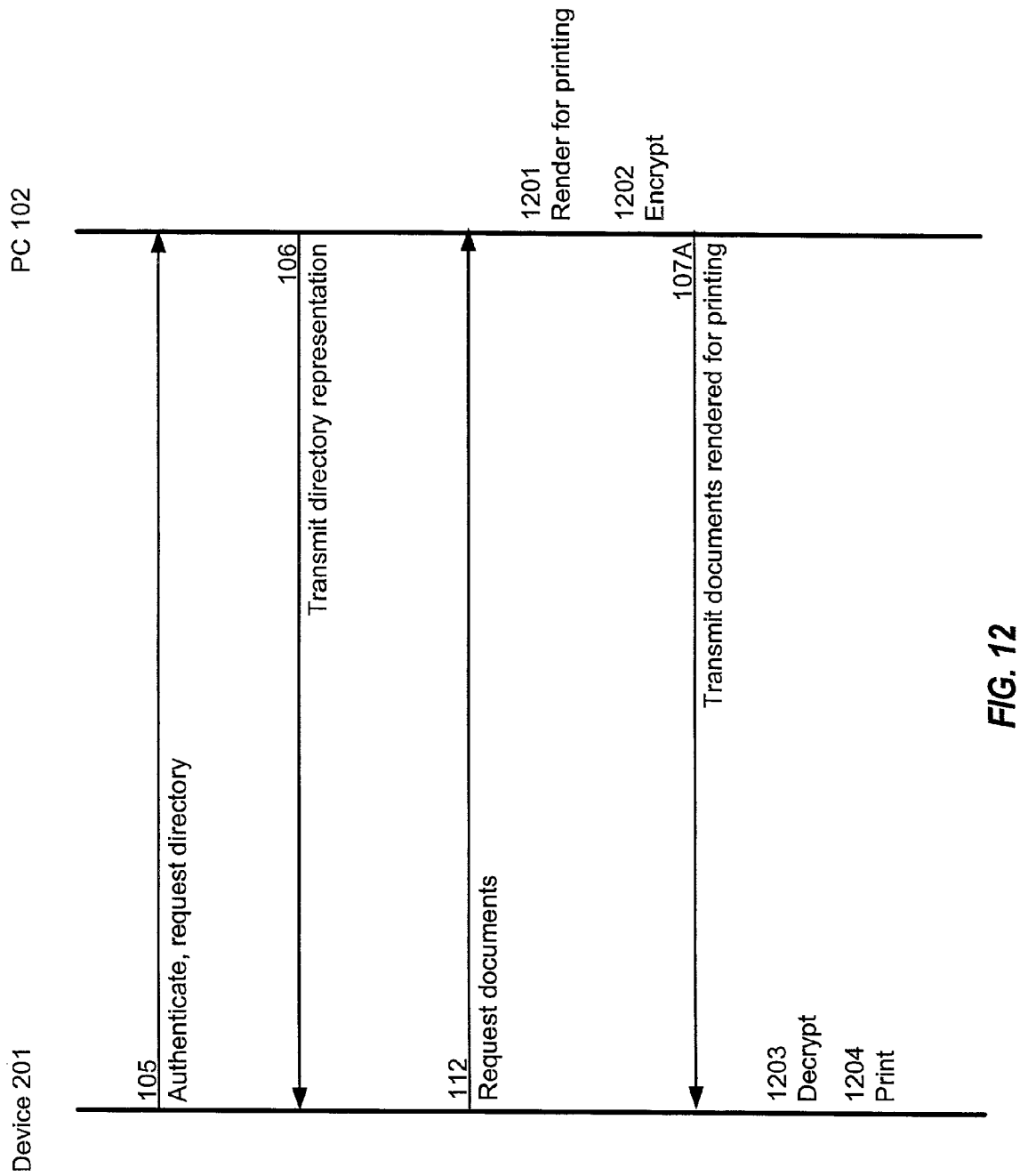
FIG. 12 is an event trace diagram depicting a series of steps for remote retrieval as implemented using a printer or multifunction device according to the present invention.

Referring now to FIG. 2, there is shown a block diagram depicting a system 200 for remote retrieval as implemented using a printer or multifunction device 201 according to the present invention. Referring also to FIG. 12, there is shown an event trace diagram depicting a series of steps for remote retrieval as implemented using a printer or multifunction device according to the present invention. As shown in FIGS. 2 and 12, multifunction device 201 is shown in lieu of device 109, to indicate that the user 101 now selects, retrieves, and prints documents from his or her PC 102 by interacting with device 201. Device 201 is, in one example, a Grand World multifunction device as may be available from Ricoh Corporation. Alternatively, device 201 may be a conventional printer that is enhanced with additional controllers and software to provide user interface and network communication capability for connecting to a network and to receive documents via e-mail. One skilled in the art will recognize that in alternative embodiments, device 201 may be any device that has output (such as printing) capability, user interface functionality, and network communication capability.

In the implementation shown in FIG. 2, it is assumed that user 101 is in the same room as device 201 (or otherwise has control over the operation of device 201) and wishes to print a document from his or her PC 102. User 101 initiates a command on device 201 that requests a directory of documents from PC 102. As described above in connection with FIG. 1, device 201 generates and sends an e-mail message 105 to device 102. The e-mail message contains authentication information and a request for the directory data.

As described above, PC 102 receives e-mail message 105 and authenticates the user. Once the user has been authenticated, PC 102 transmits, via e-mail, a representation 106 of directory 108 (or a subset thereof) to device 201. Device 201 presents representation 106 to user 101. User 101 selects one or more documents he or wishes to print on device 201. Device 201 then transmits an e-mail message to PC 102 specifying the document(s) requested by user 101, and further requesting that the document(s) be provided in a print-ready format. In response to the message, PC 102 retrieves the identified document(s) from storage 103, converts (renders) 1201 the retrieved document(s) to a print-ready format using application software 202 and printer driver 203 suited to device 201, encrypts 1202 the document (s), and transmits an e-mail message 107A to device 201 including the encrypted document(s), already rendered for printing, as an attachment.

Upon receipt of e-mail message 107A, device 201 decrypts 1203 and prints 1204 the attached document(s). In one embodiment, the user can specify how many copies are to be printed, change the print size or paper source, or otherwise change the characteristics of the printing operation.

By using application software 202 and printer drivers 203 located on PC 102 (or otherwise usable by PC 102), the invention is able to provide print-ready versions of documents to device 201. Thus, the individual characteristics of the PC installation are utilized, and the appearance of the printed document is exactly the same as if the user had initiated the print job directly from PC 102 in a conventional manner. For example, all font characteristics, application settings (such as hyphenation, for example), preferences, language packs, embedded images, and the like, are preserved.

One skilled in the art will recognize that the techniques described above in connection with FIG. 8 can be applied to an architecture that includes device 201.

Figure 13:
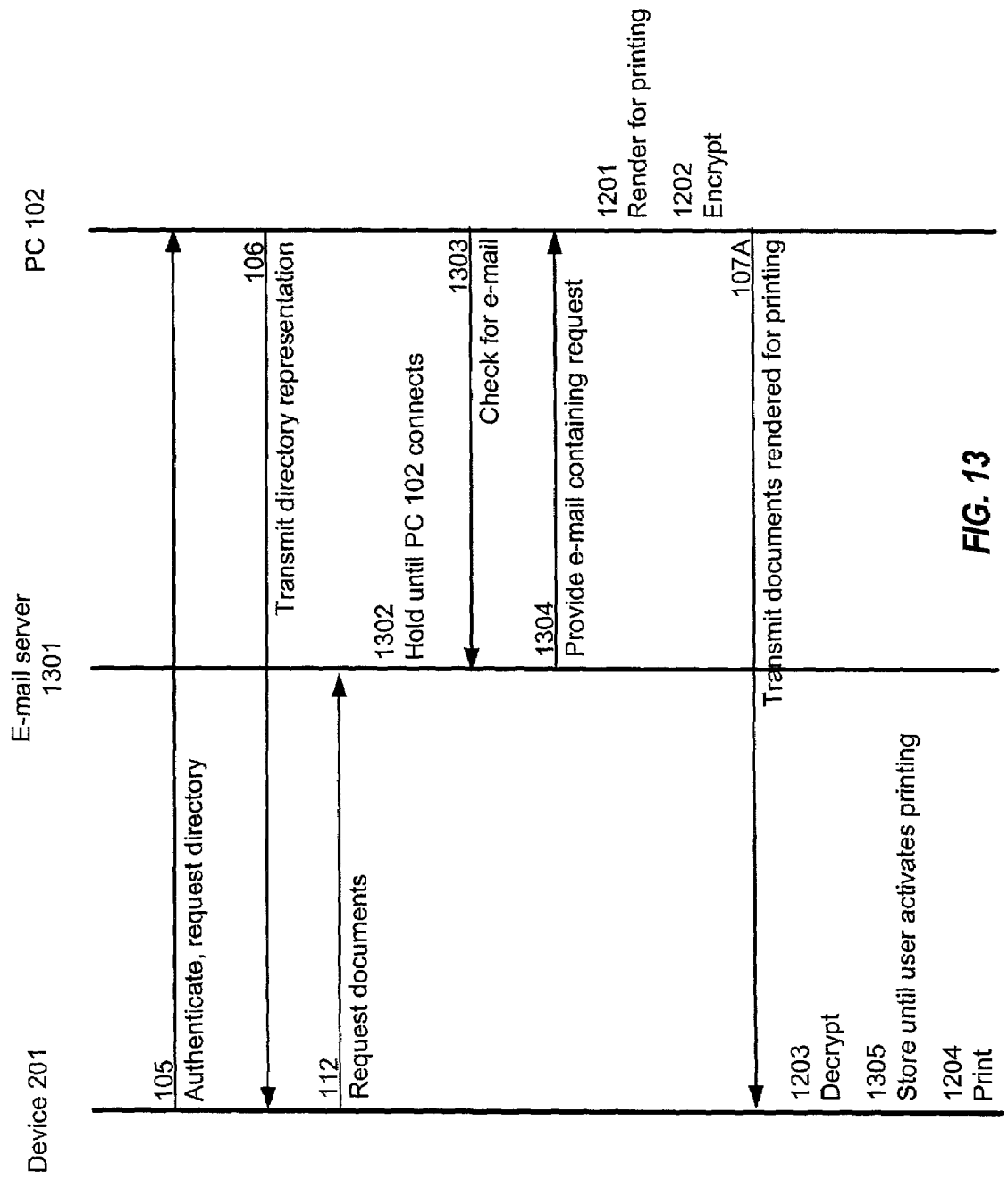
FIG. 13 is an event trace diagram depicting a series of steps for remote retrieval wherein the PC having the requested document is not immediately available.

Referring now to FIG. 13, there is shown an event trace diagram depicting a series of steps for remote retrieval wherein the PC having the requested document is not immediately available. In one embodiment, if PC 102 is not connected or available at the time documents are requested, the e-mail message containing the request is held unread 1302 at an e-mail server 1301, according to known techniques of e-mail transmission. When PC 102 connects 1303 to the e-mail server to check for new e-mail, it reads 1304 the e-mail containing the request and processes the request as described above. Since some time may have elapsed since user 101 initially requested that the document be retrieved or printed, it is possible that by the time PC 102 processes the request and transmits 107A rendered documents to device 201, user 101 may no longer be physically present at device 201. Accordingly, the print job containing rendered documents 107A may be stored 1305 at device 201 until user 101 returns to device 201. At such time, user 101 identifies himself or herself at device 201, and device 201 proceeds with the print job 1204.

Figure 3:
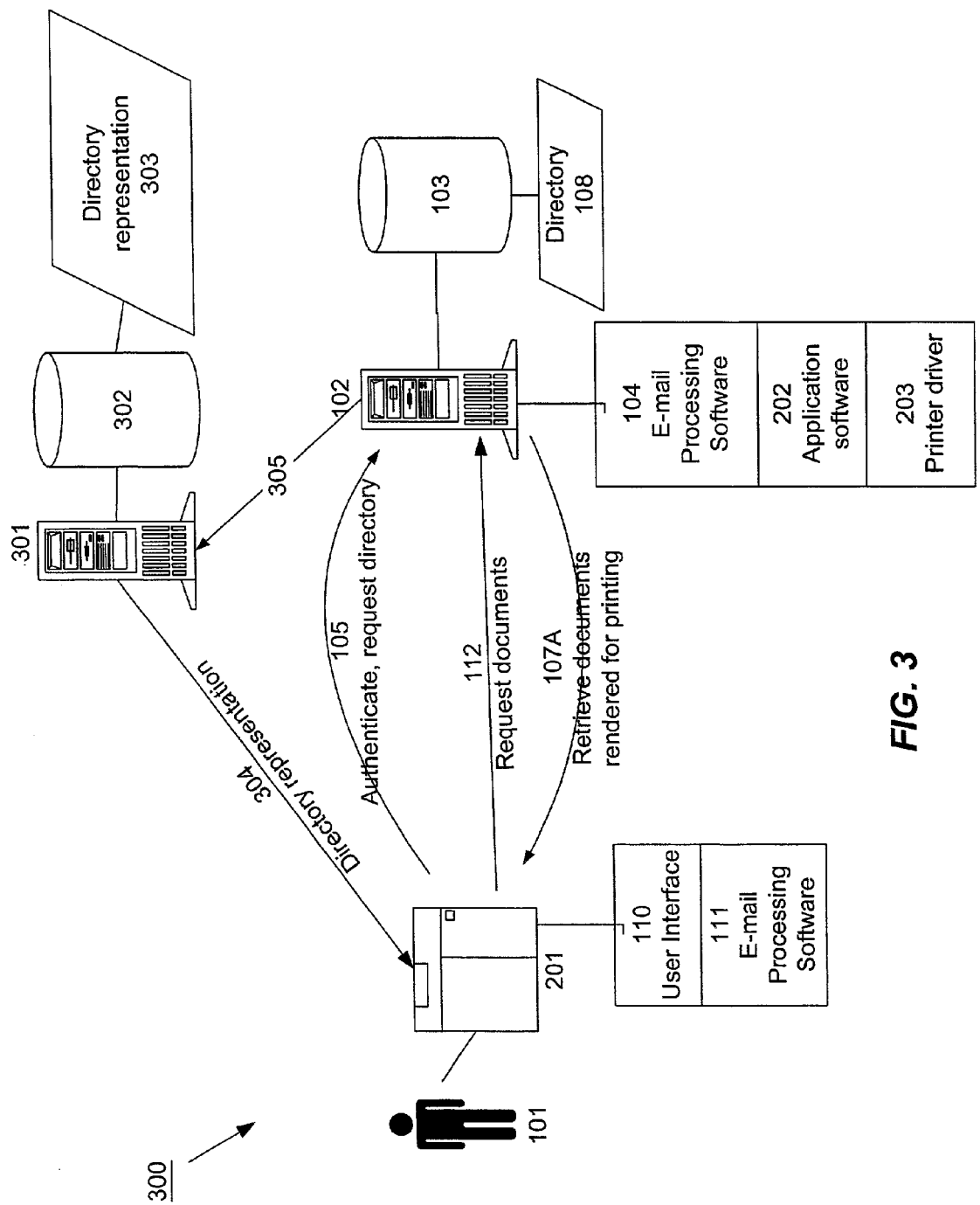
FIG. 3 is a block diagram depicting a system for remote retrieval using a cached representation of a PC directory.
Figure 14:
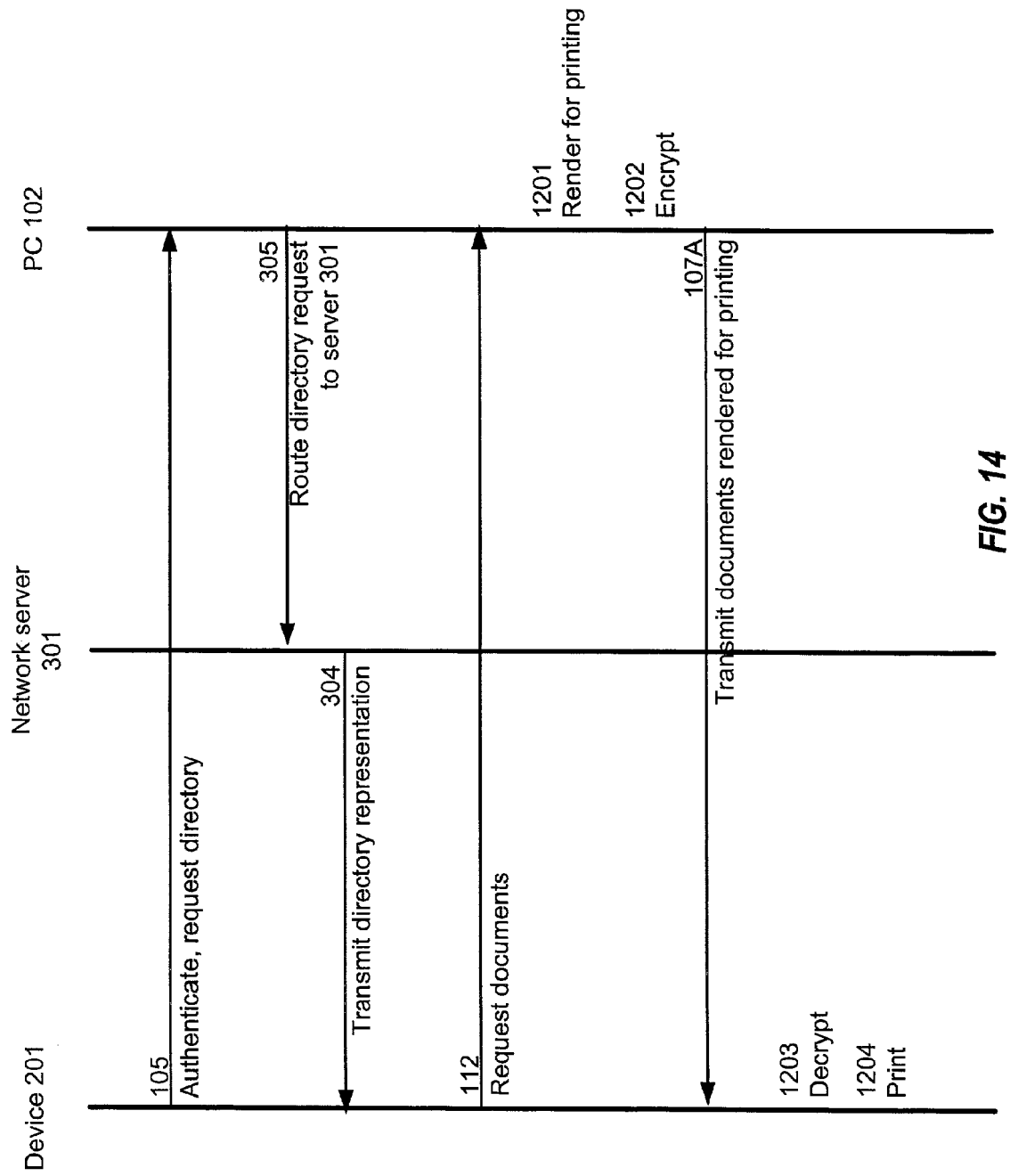
FIG. 14 is an event trace diagram depicting a series of steps for remote retrieval using a cached representation of a PC directory.

Referring now to FIG. 3, there is shown an embodiment in which a representation 303 of directory 108 is stored in a cache 302 on a network server 301. Referring also to FIG. 14, there is shown an event trace diagram depicting a series of steps for remote retrieval using a cached representation of a PC directory, assuming the representation of the PC directory has been previously stored on network server 301. When device 201 requests 105 directory information, the request is routed 305 to network server 301. In an alternative embodiment, device 201 requests directory information directly from server 301 rather than sending the request to PC 102. Device 201 may obtain a uniform resource locator, IP address, or other identifier for server 301 in an initialization or setup step, or it may obtain such an identifier as part of a response to a previous request for a directory or documents.

Upon receipt of the request, network server 301 transmits 304 directory representation 303 to device 201. Thus, directory representation 303 can be made available to device 201 more quickly and without requiring PC 102 to respond to directory requests. Freeing up PC 102 from responding to such requests eases the burden on PC 102 and provides improved response time.

Network server 301 can be located remotely with respect to PC 102 and device 201. Server 301 may be implemented, for example, using a Document Mall device available from Ricoh Corporation, or any other network server device as is well known in the art. Subject to security limitations, server 301 may store directory representations 303 for any number of PCs 102 at any number of locations. In one embodiment, a directory representation 303 may be stored at device 201. Stored directory representations 303 may be updated periodically based on changes in directory configurations on PC 102. For example, when changes occur, PC 102 may send a message to any devices having stored directory representations 303, prompting the devices to update their representations 303 accordingly.

In an alternative embodiment, device 201 checks whether a current stored directory representation 303 is available, either locally or at an accessible device. If no representation 303 is available, or if the available representation 303 is not sufficiently up to date, PC 102 retrieves directory 108 and provides it to device 201 in the manner described above in connection with FIG. 2.

One skilled in the art will recognize that a similar variation to that depicted in FIG. 3 could be implemented for use with device 109 such as that displayed in FIG. 1.

Figure 4:
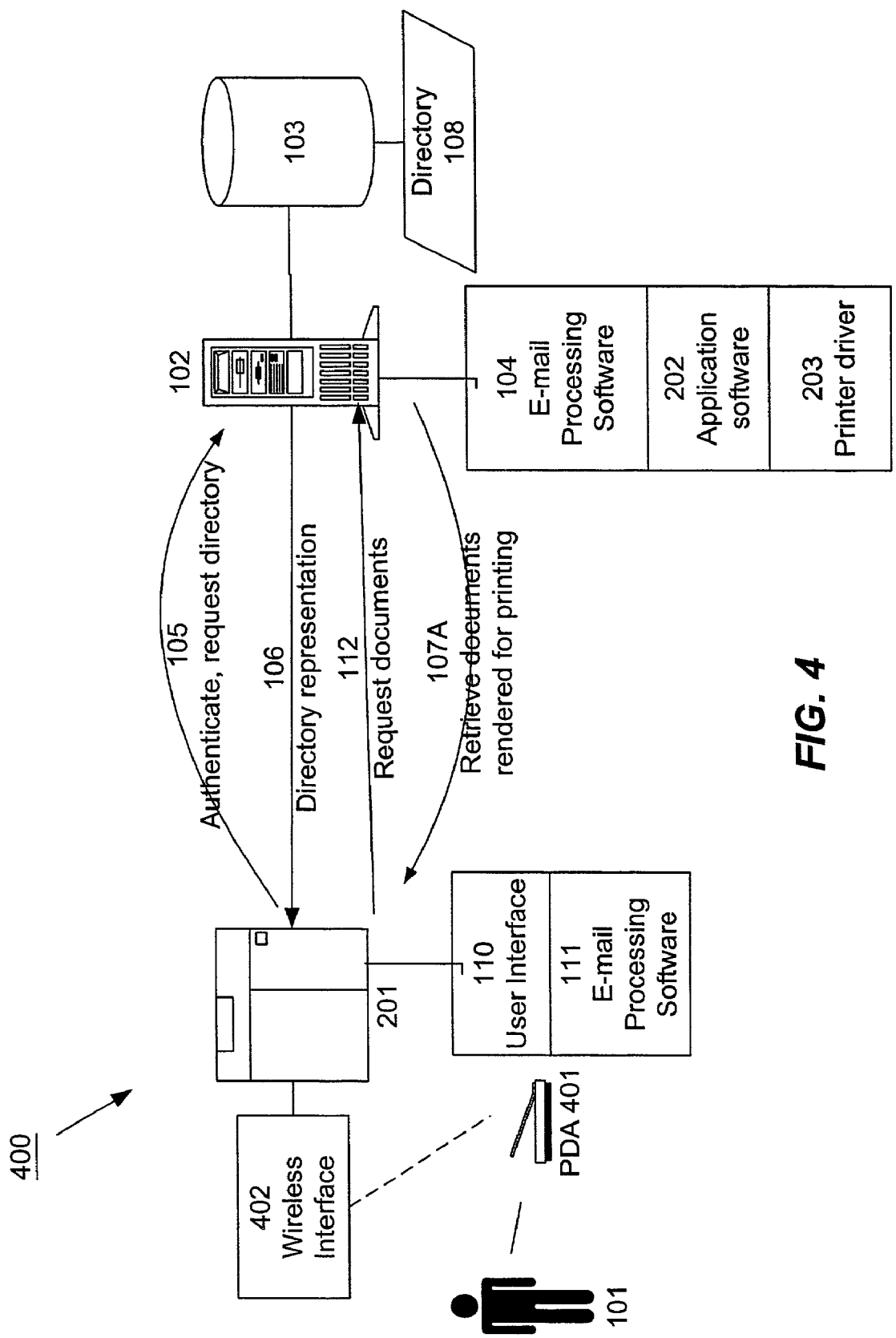
FIG. 4 is a block diagram depicting a system for remote retrieval via a wireless device.

One skilled in the art will recognize that other variations on the above-described structures and methods of operation are possible. For example, referring now to FIG. 4, there is shown an embodiment wherein device 201 is equipped with a wireless interface 402, for example according to the 802.11b protocol. In such an arrangement, user 101 may interact with device 201 via a personal digital assistant (PDA) 401 that is capable of 802.11b wireless communications. Specifically, user 101 may navigate directories and select files, as described above, using the input and output components of PDA 401 that communicates via interface 402 with device 201. User 101 may thereby use the system of the present invention as a bridge between his or her PDA 401 and files stored in his or her PC 102.

Figure 9:
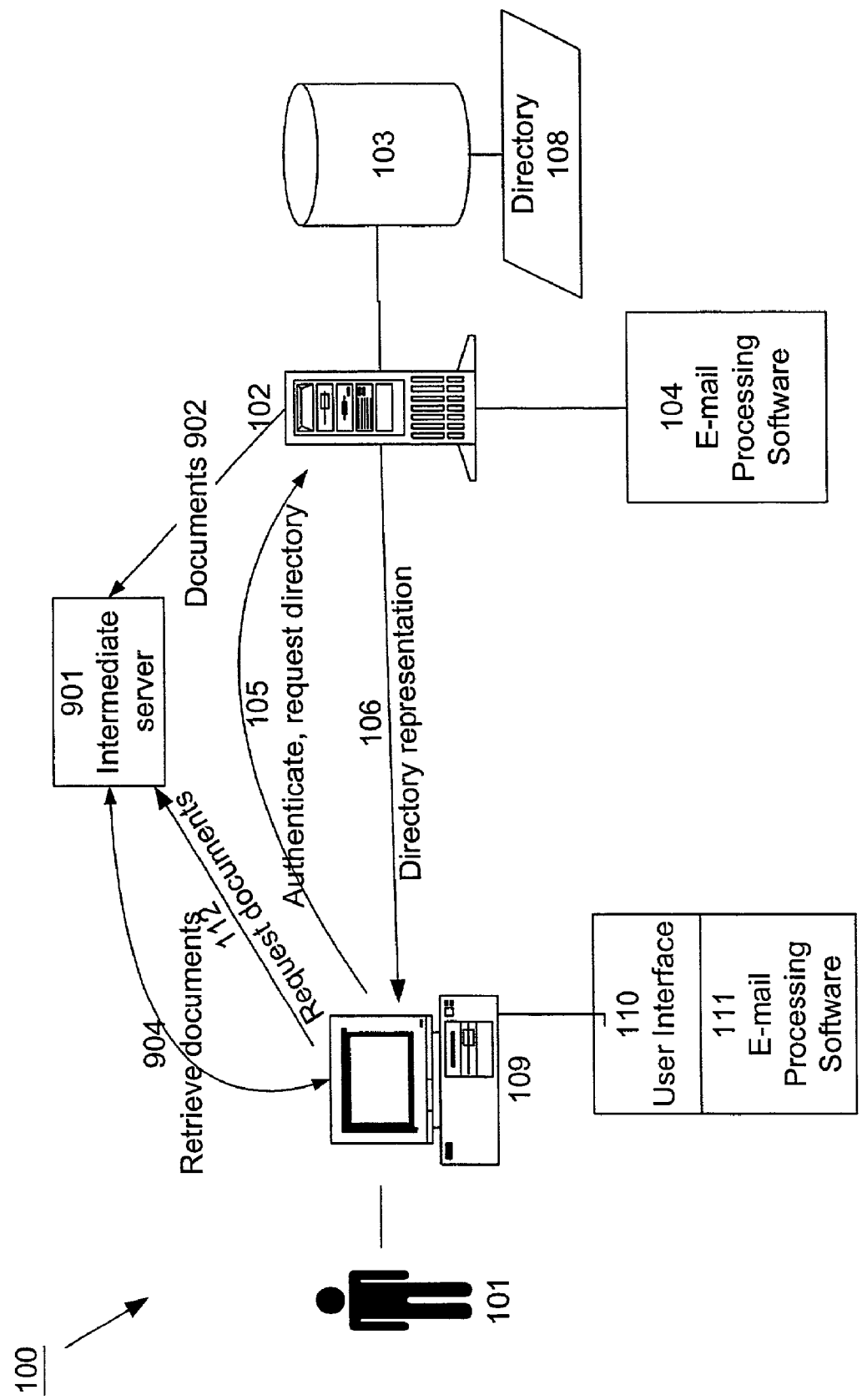
FIG. 9 is a block diagram depicting a system for remote retrieval using an intermediate server according to the present invention.
Figure 15:
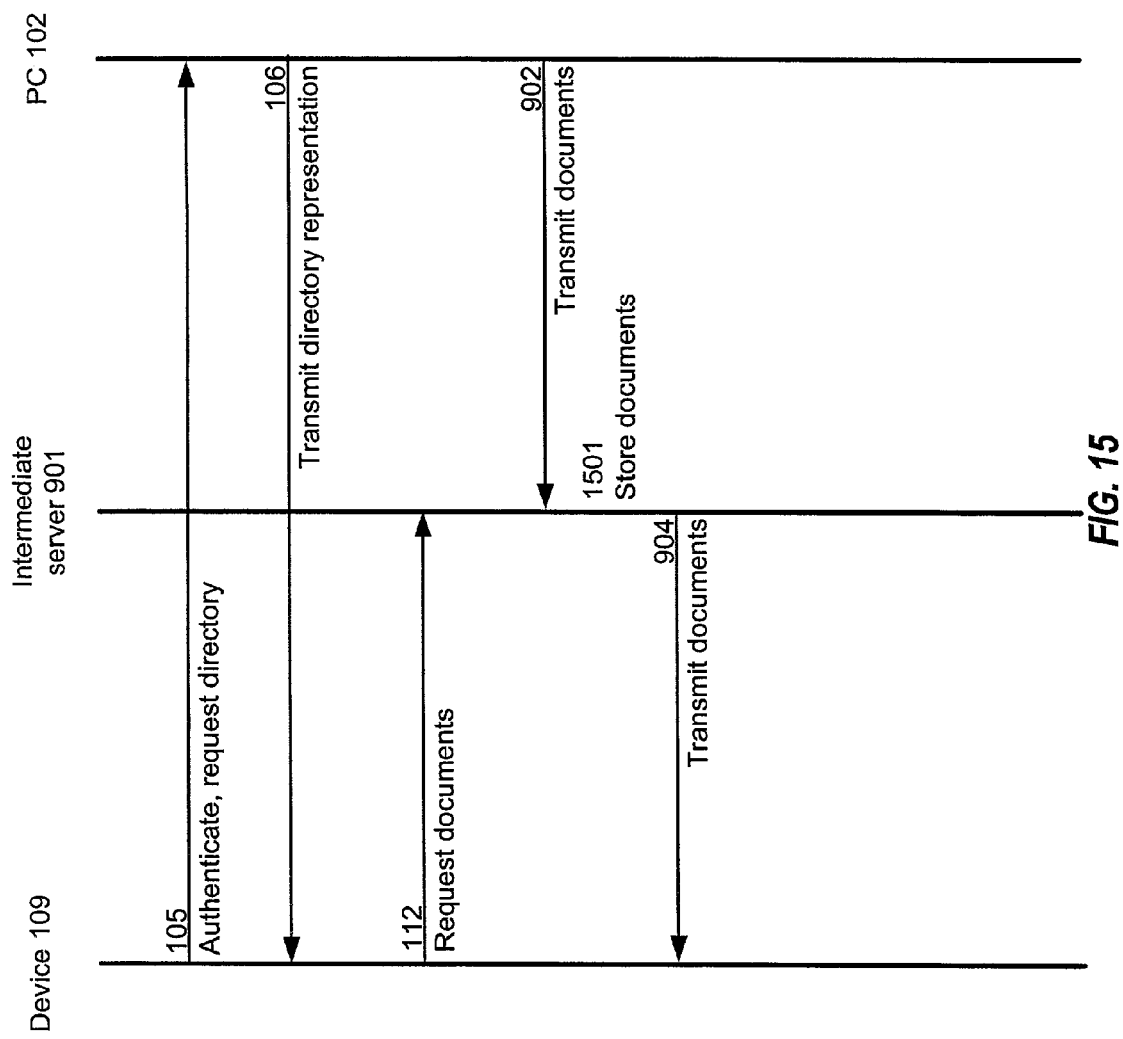
FIG. 15 is an event trace diagram depicting a series of steps for remote retrieval using an intermediate server according to the present invention.

Referring now to FIG. 9, there is shown another alternative embodiment, wherein intermediate server 901 is used. The implementation depicted in FIG. 9 may be particularly useful in an environment such as a peer-to-peer network or running networked applications such as Lotus Notes or Microsoft Exchange. Server 901 may be a web server, bulletin board, or other repository or storage device. Referring also to FIG. 15, there is shown an event trace diagram depicting a series of steps for remote retrieval wherein intermediate server 901 is used. Whenever documents are requested (either by a directory request or a search request), PC 102 provides the documents 902 to server 901, which stores 1501 the documents. Device 109 can then obtain the documents from server 901, thus avoiding excessively burdening PC 102 with document requests. Other devices similar to 109 can also obtain 904 the documents from server 901. In one embodiment, PC 102 may provide device 109 with information for identifying the location or address of server 901. In one embodiment, the directory and/or documents are replicated automatically on server 901, either periodically or in response to a retrieval request so that the directory and/or documents will be available more quickly if requested again in the future. Directory and/or documents may be deleted from server 901 after a predetermined time period or after some period of nonuse.

Software Implementation

As described above, the invention may be implemented using software components 110, 111, and 104. Software components 110 and 111 are installed on device 109 or 201, and software component 104 is installed on PC 102.

E-mail processing software 104, installed on PC 102, recognizes directory information requests and document requests from device 109 or 201, authenticates user 101 as appropriate, and responds to the received requests automatically with directory representations 106 or (encrypted) retrieved documents 107 or 107A. Software 104 renders a document for printing using application software 202 and printer driver 203 as needed, according to the received request for a document. Finally, software 104 can be configured to periodically and automatically search for and retrieve updated printer drivers 203 from servers providing such information, according to techniques that are well known in the art.

User interface 110 provides input and output functions at device 109 or 201, allowing user 101 to log in and navigate among directories, request files, specify print characteristics, and the like. Software 111 generates e-mail requests for directory information and documents, and receives and processes e-mail responses received from device 102. Thus, in response to a user requesting directory information or a document, software 111 generates and sends an e-mail request identifying the directory or file and the device 109 or 201 from which the request was made.

Software 111 can be implemented using any readily available e-mail system. Software 111 can automatically generate e-mail requests using a Compose window from within an e-mail system. Software 111 automatically decrypts directory representations and received documents; functionality for automatic decryption of such items may be implemented, for example as a Java program that can be downloaded as needed at runtime.

In another embodiment, user interface 110 and software 111 can be implemented using a pre-installed plug-in, or built-in operating system functionality. One skilled in the art will recognize that many different mechanisms are possible for installing and implementing the user interface and e-mail processing capability of the present invention.

Directory representation 106 can be provided according to any desired format that is understandable by software 111. In one embodiment, PC 102 generates representation 106 in JavaScript or in extended markup language (XML), and user interface 110 provides functionality for browsing the directory representation 106 according to conventional mechanisms. The JavaScript or XML version of directory representation 106 is, in one embodiment, generated by software 104 from conventional hierarchical directory data as may be provided by an operating system such as Microsoft Windows. For example, in one embodiment, PC 102 generates directory representation 106 by navigating the file tree of a conventional hierarchical file system. Starting at a folder, PC 102 lists all the items in that folder. If an item is a subfolder, PC 102 executes the same process on that subfolder. Algorithmic techniques for such traversal of a file system are well known.

As described previously, in one embodiment, representation 106 contains meta-information for each document. Such meta-information may include, for example, the date of creation, date of last modification, author, application and version used in creating the document, size, and the like. Representation 106 may also contain document summaries, thumbnail images, or other abridged representations of documents that can assist a user in discerning the contents of documents without having access to the complete originals. User interface 110 interprets and presents such meta-information, summaries, thumbnails, and the like, and displays these information items for user 101, as user 101 navigates through the directory.

In one embodiment, e-mail processing software 104 is implemented as an operating system plug-in, such as a Windows service, that is pre-installed on PC 102 according to techniques that are well known in the art. In one embodiment, installation includes printer drivers 203 for any devices 201 connected to PC 102 over a network, or to which PC 102 has access. Drivers 203 can periodically be updated or added as needed, via automated or user-initiated download, or via any other means. Including printer drivers 203 in the installation ensures that PC 102 is able to generate document versions that are print-ready at device 201.

Software 104 periodically polls an e-mail server (not shown) associated with PC 102 to determine whether there are any new e-mail messages requesting directory representations or documents. Such polling may be performed using known functional capabilities of e-mail clients such as, for example, Microsoft Outlook, or it can be programmed as a function of software 104 so as to be independent of any particular e-mail client software application.

User Interface

Figure 5:
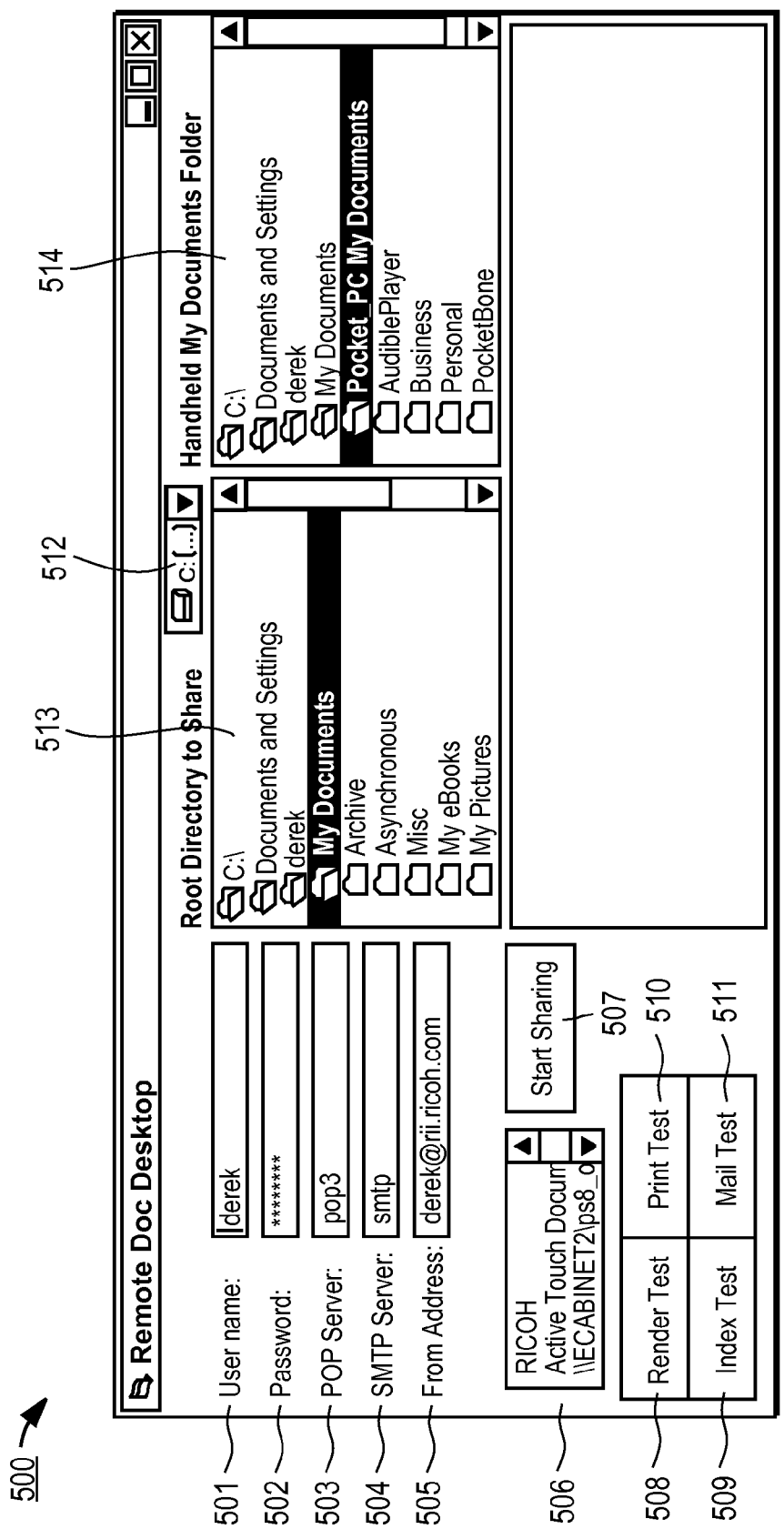
FIG. 5 is a screen shot depicting an example of a user interface for a PC-based software component according to one embodiment.

Referring now to FIG. 5, there is shown a screen shot depicting an example of a user interface window 500 for a PC-based software component according to one embodiment. Window 500 may be displayed on a display screen of PC 102. Window 500 includes a number of user interface elements for configuring PC 102 to respond to requests for directory information and documents in order to facilitate remote access as described above, and for specifying various parameters and limitations on the remote access. User 101 may control the various elements of window 500 using conventional input devices, such as a keyboard, mouse, touch-screen, or the like. Thus, user 101 would activate screen 500 as part of the set-up operation for initially configuring access to PC 102, or for changing the parameters of such access. Screen 500 may automatically appear upon installation of the PC-based software component of the present invention, so as to enable initial configuration. In one embodiment, user 101 can launch screen 500 only upon verification of login credentials; in this manner, unauthorized users are deterred from changing the parameters of remote access.

User name field 501 and password field 502 allow user 101 to specify the login credentials that will allow access to documents stored on PC 102. POP server field 503, SMTP server field 504, and from address field 505 specify the e-mail parameters for communication with PC 102. Device list 506 provides a scrollable list of devices from which user 101 might wish to access documents on PC 102. User 101 can select particular devices from list 506, so that only requests from those devices will be honored. Alternatively, user 101 can specify that any authenticated request from any device be honored. Start sharing button 507 activates sharing of files stored on PC 102 in accordance with the parameters specified in screen 500. Thus, once user 101 has clicked on start sharing button 507, software 104 will begin responding automatically to authenticated requests for directory information or documents. In one embodiment, once user 101 has clicked on start sharing button 507, the button changes to a stop sharing button (not shown).

Test buttons 508 through 511 initiate tests of various functions of software 104, including a test of print rendering 508, a test of printing 510, a test of directory information transmission 509, and a test of mail functionality 511.

Window 513 allows user 101 to specify which directories are to be made available via the functionality of the present invention. Multiple selections are possible. In one embodiment, only those files residing within the selected folders will be transmitted by software 104, and files residing in other folders cannot be accessed remotely using the functionality of the present invention. In addition, in one embodiment, only the directory information for selected folders will be transmitted in response to requests for directory information. Drive selection popup menu 512 allows user 101 to specify which drive or other resource is shown in window 513.

Window 514 allows user 101 to specify directories in an auxiliary device that can be uploaded and/or made available via the functionality of the pre-sent invention. As with window 513, multiple selections are possible.

Figure 6:
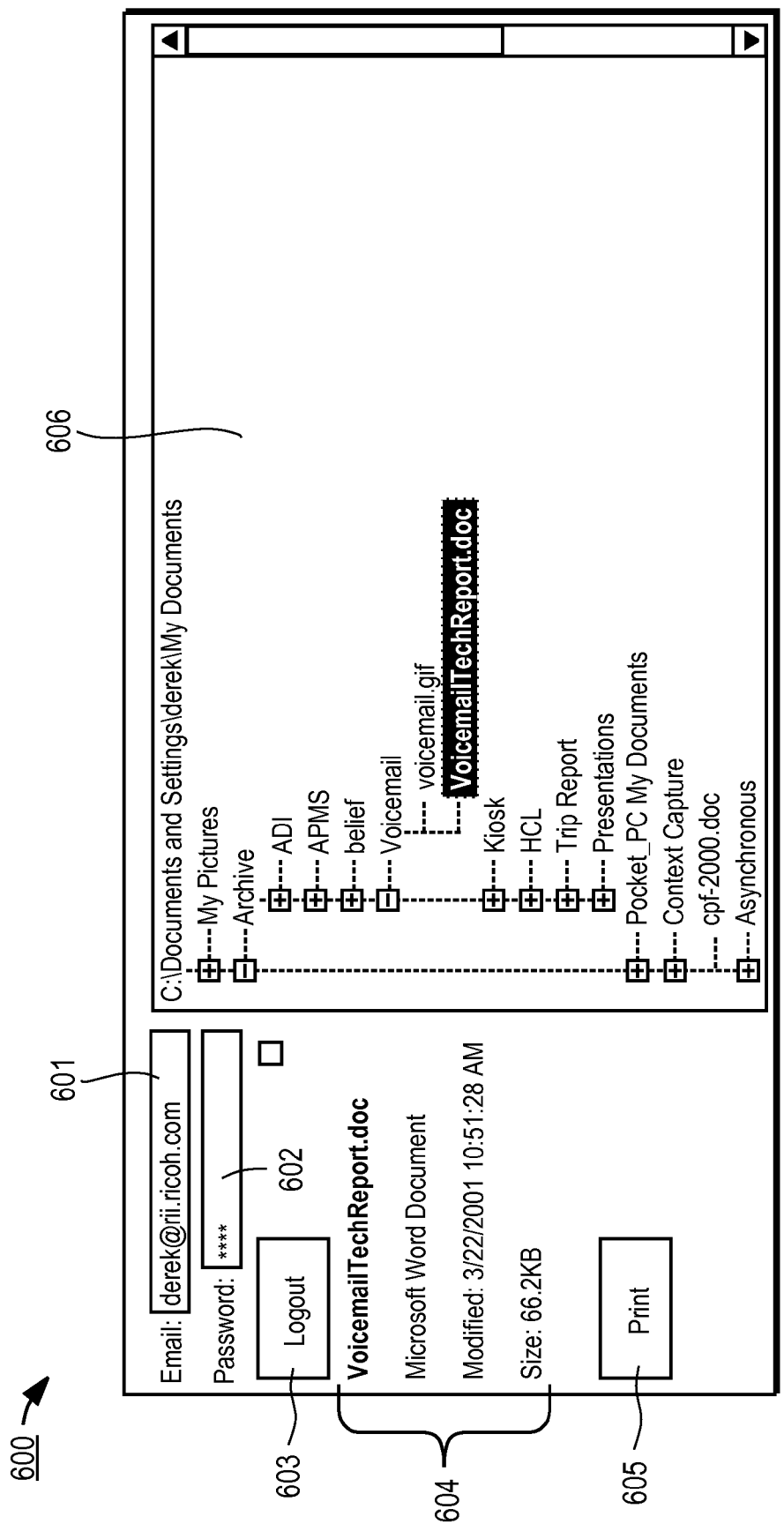
FIG. 6 is a screen shot depicting an example of a user interface for a remote device-based software component according to one embodiment.

Referring now to FIG. 6, there is shown a screen shot depicting an example of a user interface window 600 for a remote device-based software component according to one embodiment. Window 600 may be displayed on a display screen of device 109 or 201, in order to provide user 101 with access to documents on his or her PC 102. Window 600 includes a number of user interface elements for navigating and selecting files for retrieval, and for providing authentication information. User 101 may control the various elements of window 600 using conventional input devices, such as a keyboard, mouse, touch-screen, or the like.

E-mail field 601 accepts user input specifying an e-mail address. This e-mail address serves as an identifier of PC 102, so that device 109 or 201 sends requests for directory information and for documents by e-mail to the specified address. In an alternative embodiment, device 109 or 201 may store associations between user identifiers and e-mail addresses, so that user 101 may provide an identifier (or select from a number of on-screen choices), and device 109 or 201 can then look up the corresponding e-mail address. In another alternative embodiment, device 109 or 201 may store a history of previously entered e-mail addresses, and may present these as selections in an on-screen menu, so that user 101 can specify an e-mail address without having to type it in. In yet another embodiment, device 109 or 201 may transmit requests for directory information and documents by some mechanism other than e-mail, so that field 601 might be replaced by some other field for identifying user 101 or PC 102.

Password field 602 accepts user input of a password for authentication purposes. The entered password is compared against a previously stored password; if the entered password fails to match, access to directory information or documents is denied. In alternative embodiments, other authentication methods may be used. For example, a thumbprint scanner, retinal scanner, or smart card reader may be attached to device 109 or 201; user 101 provides the appropriate biometric data or magnetic card in order to proceed.

Once user 101 has provided his or her e-mail address in field 601 and password in field 602, he or she clicks on an enter button or login button (not shown). Device 109 or 201 generates and transmits a directory request 105, including the entered authentication information, to PC 102, according to the techniques described above. Upon receipt of directory representation 106, directory 606 is displayed. In the example shown in FIG. 6, directory 606 is presented as a hierarchical, dynamic, navigable input/output element. User 101 can selectively expand or collapse folders, and can select one or more items within directory 606. In one embodiment, metadata 604 is displayed for items selected by user 101.

User 101 can specify that a selected item be printed on device 109 or 201 by clicking on print button 605. One skilled in the art will recognize that screen 600 may include any number of buttons for initiating other actions that may be performed with respect to selected documents. For example, a display button may cause the selected item to be displayed, or previewed, on the screen of device 109 or 201. A transmit button may cause the selected item to be transmitted to another device or computer; user 101 may be prompted to enter a destination for the transmittal.

Once user 101 clicks on print button 605 (or another button specifying an action), device 109 or 201 generates and transmits an e-mail message to PC 102, requesting the selected document. The document is retrieved, formatted, encrypted, and transmitted back to device 109 or 201 (or to another device), according to techniques described above. Once the document is received at device 109 or 201, device 109 or 201 performs the specified action. For example, if user 101 requested that the selected document be printed, device 109 or 201 prints the document.

The process of transmitting and receiving requests for directory information and documents, and authenticating user's 101 login credentials, is invisible to user 101. Thus, from user's 101 point of view, printing (or otherwise accessing) a document is as simple as selecting the document from a displayed directory and clicking on a button to perform the desired action.

Figures 7A, 7B:
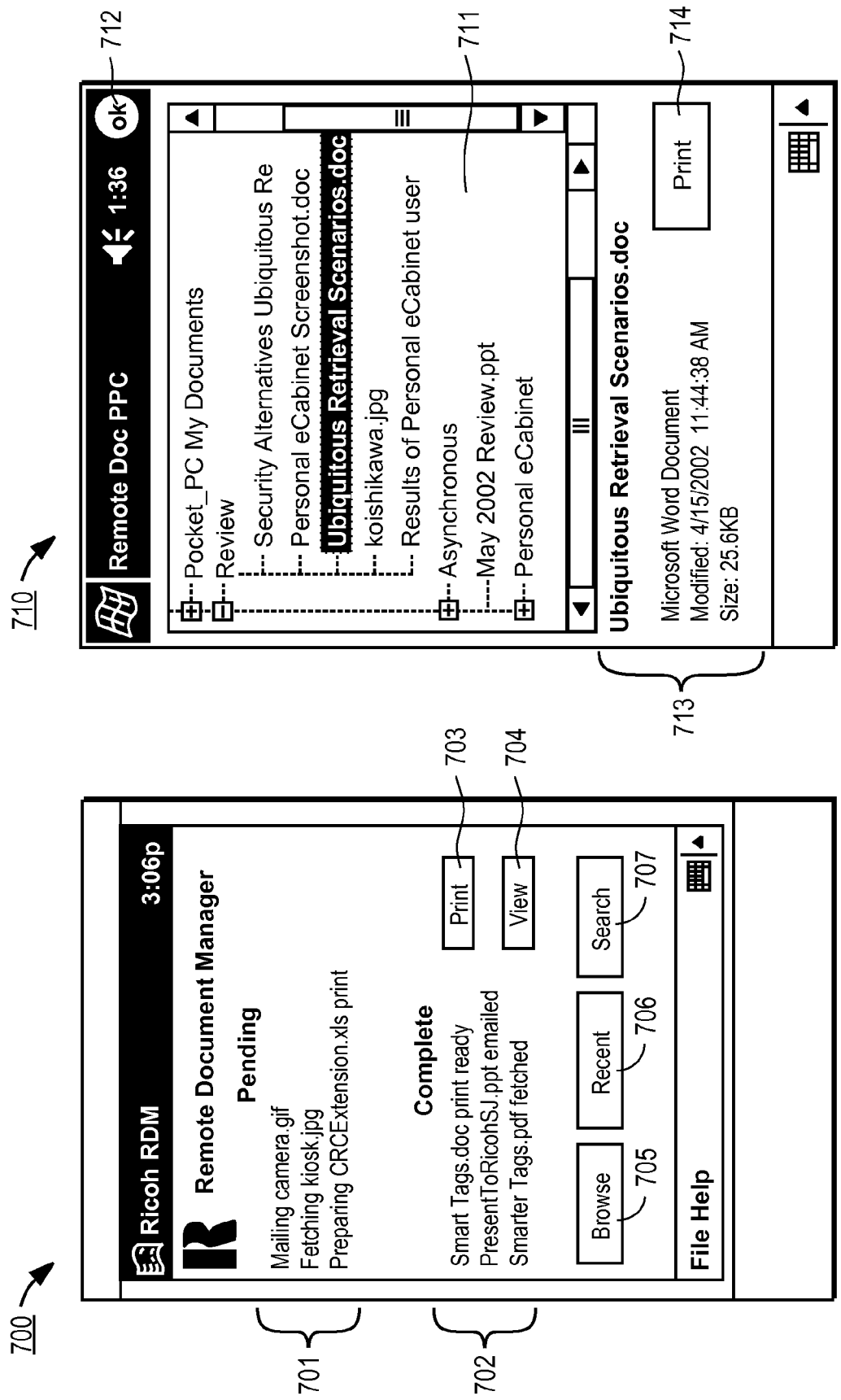
FIGS. 7A and 7B are screen shots depicting an example of a user interface for a PDA-based software component according to one embodiment.

Referring now to FIGS. 7A and 7B, there are shown screen shots depicting examples of user interface screens 700 and 710, respectively, for a PDA-based software component according to one embodiment. As described above in connection with FIG. 4, the invention can implemented using a PDA 401 having a wireless interface 402 for communicating with device 201, allowing user 101 to select and retrieve files from his or her PC 102, and to control print functions on device 201, from PDA 401.

Screen 700 includes a list 701 of documents for which some action is pending, including previously requested actions such as transmitting, receiving, or processing various documents. In one embodiment, user 101 can click on an item, or on an on-screen button or menu command, to view more details as to the status of the pending action, or to modify or cancel the item.

Screen 700 also includes a list 702 of documents for which some action has been completed. For documents available to be printed, a print button 703 is provided; user 101 can click on print button 703 to initiate the print job at device 201. For documents available to be viewed on-screen, a view button 704 is provided; user 101 can click on view button 704 and the document is presented on the display screen of PDA 401 (or on some other device). Additional action buttons may be provided for other completed action items and documents, depending on the type of action that is appropriate for the document. Examples of such additional buttons include: delete, transmit, edit, forward, reply, and the like. In an alternative embodiment, other user interface elements may be provided instead of buttons; for example, a context-sensitive pop-up menu may be provided for selecting an action to be performed in connection with a document.

Browse button 705 activates browsing screen 710. In one embodiment, screen 710 is presented alongside or overlapping screen 700; in another embodiment, screen 710 replaces screen 700. Screen 710 includes window 711 that presents the selected directory as a hierarchical, dynamic, navigable input/output element, similar to directory representation 606 discussed above in connection with FIG. 6. As described above, user 101 can selectively expand or collapse folders, and can select one or more items within directory 606. When a document is selected, information 713 describing the document is displayed, including for example the document type, date of creation, size, and the like. Print button 714 initiates the print job at device 201. OK button 712 dismisses window 711 and returns the user to screen 700.

Recent button 706 causes PDA 401 to display a list of recently accessed directories or documents. Search button 707 activates a search function; user is prompted to enter one or more search terms, and PDA 401 presents a list of matching documents from retrieved directories associated with user 101.

The user interface for PDA 401 may, in one embodiment, further include screens and commands for authenticating the user, configuring device 201, deleting previously retrieved documents and action items, and the like.

E-mail formats

In one embodiment, as described above, the present invention employs e-mail as a transport mechanism for various requests and responses for directory information and for documents. The following are examples of e-mail formats for a directory information request, a directory information transmittal, a print request, and a print-ready document transmittal. As described above, the various components of the invention are configured to generate and respond to e-mails according to these formats. One skilled in the art will recognize that the following e-mail formats are merely exemplary, and that any other format may instead be used.

Directory Information Request: <IndexRequest>
Subject: <IndexRequest>
From: e-mail address of requesting device
To: e-mail address of PC having requested directory
Body of message: blank
Attachment: none
Directory Information Transmittal: <IndexReturn>
Subject: <IndexReturn>
From: e-mail address of PC having requested directory
To: e-mail address of requesting device
Body of message: blank
Attachment: text file entitled "remdocindex.txt", formatted as follows:
  first line: path to directory
  remaining lines: list of files in directory, including meta-information Each line of the file list in remdocindex.txt is formatted as follows: filename?path?date-modified?file-type?size (where path indicates the path within the requested directory. An example of a portion of remdocindex.txt is shown below:

C:\Documents and Settings\derek\My Documents
sample.jpg?My Pictures\?6/16/2000 1:58:12 PM?JPEG Image?9894
product.jpg?My Pictures\?6/29/2000 4:00:42 PM?JPEG Image?4883
product.gif?My Pictures\?6/29/2000 4:03:52 PM?GIF Image?6086
tn_e-mail.jpg?My Pictures\?6/29/2000 4:04:50 PM?JPEG Image?7854
papers.gif?My Pictures\?7/5/2000 1:32:28 PM?GIF Image?1494
Authors.doc?Misc\?7/17/2000 5:56:28 PM?Microsoft Word Document?70144
Progress.txt?Misc\?6/29/2000 1:30:20 PM?Text Document?469
Retrieval.doc?Unconscious\Brainstorming\?9/26/2000 11:22:02 PM?Microsoft Word Document?24064
Schedule for the next two weeks.doc?Misc?\8/31/2000 4:15:24 PM?Microsoft Word Document?19456
Print Request: <PrintRequest>
Subject <PrintRequest>
From: e-mail address of requesting device
To: e-mail address of PC having requested document
Body of message: document's filename, including path (example: C:\Documents and Settings\derek\My Documents\Dereks Next Projects.doc)
Attachment: none
Print-Ready Document Transmittal: <PrintReturn>
Subject <PrintReturn>
From: e-mail address of PC having requested document
To: e-mail address of requesting device
Body of message: blank
Attachment: document, in print-ready format (such as PostScript)

One skilled in the art will recognize that other user interface arrangements and configurations may be implemented without departing from the essential characteristics of the present invention, and that the particular layout and features depicted in the above-described user interface screens are merely exemplary. As can be seen from the above examples, the present invention enables secure, remote selection and retrieval of stored electronic documents from a user's PC (or other device). As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A computer-implemented method for remotely selecting and retrieving an electronic document, comprising:
at a first device, receiving from a remote device a first electronic mail message containing a request for a directory;
responsive to the received first message, transmitting, from the first device to the remote device, a second electronic mail message containing a directory describing a plurality of stored documents and their relationship to each other;
at the first device, receiving from the remote device a third electronic mail message containing a request for at least one of the stored documents;
at the first device, rendering the requested at least one stored document in a print-ready format; and after the at least one stored document has been rendered in a print-ready format, and responsive to the received third message, transmitting, from the first device to the remote device, a fourth electronic mail message containing the requested at least one stored document in the print-ready format.

2. The method of claim 1, wherein the remote device comprises one selected from the group consisting of:
a personal computer;
a printer;
a fax machine; and
a multifunction device.

3. The method of claim 1, wherein:
receiving the first and third electronic mail messages comprise receiving the messages across a firewall; and
transmitting the second and fourth electronic mail messages comprise transmitting the messages across a firewall.

4. The method of claim 1, wherein the plurality of stored documents comprises documents stored on a hard drive accessible to the first device, the method further comprising:
prior to transmitting the fourth electronic mail message, retrieving the requested at least one stored document from the hard drive.

5. The method of claim 1, further comprising:
prior to transmitting the second electronic mail message, authenticating a user initiating the directory request.

6. The method of claim 1, further comprising:
prior to transmitting the fourth electronic mail message, authenticating a user initiating the document request.

7. The method of claim 1, wherein transmitting the second electronic mail message comprises:
encrypting the directory; and
transmitting an electronic mail message containing the encrypted directory.

8. The method of claim 1, wherein transmitting the fourth electronic mail message comprises:
encrypting the requested at least one stored document; and
transmitting an electronic mail message containing the encrypted at least one stored document.

9. The method of claim 1, wherein the second electronic mail message further contains meta-information describing at least one of the stored documents.

10. A computer-implemented method for remotely selecting and retrieving an electronic document, comprising:
at a first device, receiving from a remote device a first electronic mail message containing a search request;
responsive to the received first message:
at the first device, performing the requested search on a set of stored documents to obtain a list of at least one search result;
transmitting, from the first device to the remote device, a second electronic mail message containing the obtained list;
at the first device, receiving from the remote device a third electronic mail message containing a request for at least one of the stored documents;
at the first device, rendering the requested at least one stored document in a print-ready format; and
after the at least one stored document has been rendered in a print-ready format, and responsive to the received third message, transmitting, from the first device to the remote device a fourth electronic mail message containing the requested at least one stored document in the print-ready format.

11. A computer-implemented method for remotely selecting and retrieving an electronic document, comprising:
at a first device, receiving from a remote device a first electronic mail message containing a request for a directory;
responsive to the received first message:
at the first device, determining whether at least a portion of the requested directory has been designated for remote access; and
responsive to at least a portion of the requested directory being designated for remote access, transmitting, from the first device to the remote device, a second electronic mail message containing the at least a portion of the requested directory, describing a plurality of stored documents;
at the first device, receiving from the remote device a third electronic mail message containing a request for at least one of the stored documents;
at the first device, rendering the requested at least one stored document in a print-ready format; and
after the at least one stored document has been rendered in a print-ready format, and responsive to the received third message, and responsive to the requested at least one stored document being designated for remote access, transmitting, from the first device to the remote device, a fourth electronic mail message containing the requested at least one stored document in the print-ready format.

12. A computer-implemented method for remotely selecting and retrieving an electronic document, comprising:
receiving, from a user, a request for a directory;
transmitting to a remote device a first electronic mail message containing the received request;
receiving from the remote device a second electronic mail message containing the requested directory describing a plurality of stored documents and their relationship to each other;
displaying at least a portion of the received directory;
receiving, from a user, a selection of at least one document from the directory, the document being stored in a first format;
transmitting to the remote device a third electronic mail message containing a request for the selected at least one document; and
receiving from the remote device a fourth electronic mail message containing the requested at least one stored document in a print-ready format.

13. The method of claim 12, wherein the remote device comprises a personal computer.

14. The method of claim 12, wherein:
transmitting the first and third electronic mail messages comprise transmitting the messages across a firewall; and
receiving the second and fourth electronic mail messages comprise receiving the messages across a firewall.

15. The method of claim 12, further comprising:
receiving, from the user, authentication information; and
authenticating the user based on the received authentication information.

16. The method of claim 12, further comprising:
receiving, from the user, authentication information; and
transmitting, to the remote device, the received authentication information.

17. The method of claim 12, wherein the second electronic mail message contains the requested directory in an encrypted form, the method further comprising:
decrypting the encrypted directory.

18. The method of claim 12, wherein the fourth electronic mail message contains the at least one stored document in an encrypted form, the method further comprising:
    decrypting the encrypted at least one stored document.

19. The method of claim 12, wherein the second electronic mail message further contains meta-information describing at least one of the stored documents, and wherein:
    displaying at least a portion of the received directory comprises displaying at least a portion of the meta-information.

20. The method of claim 12, further comprising, after displaying at least a portion of the received directory:
    receiving, from a user, a navigation command;
    responsive to the navigation command, displaying at least a second portion of the received directory.

21. A computer-implemented method for remotely selecting and retrieving an electronic document, comprising:
    receiving, from a user, a search request;
    transmitting to a remote device a first electronic mail message containing the received search request;
    receiving from the remote device a second electronic mail message containing a list of at least one search result;
    displaying at least a portion of the received list;
    receiving, from a user, a selection of at least one document from the list, the document being stored in a first format;
    transmitting to the remote device a third electronic mail message containing a request for the selected at least one document; and
    receiving from the remote device a fourth electronic mail message containing the requested at least one stored document in a print-ready format.

22. A computer-implemented method for remotely selecting and retrieving an electronic document, comprising:
    receiving, from a user, a request for a directory;
    determining whether data describing the requested directory is available in a cache;
    responsive to data describing the requested directory being available in a cache, retrieving from the cache the requested directory describing a plurality of stored documents;
    responsive to data describing the requested directory not being available in a cache:
        transmitting to a remote device a first electronic mail message containing the received request; and
        receiving from the remote device a second electronic mail message containing the requested directory describing a plurality of stored documents;
    displaying at least a portion of the received directory;
    receiving, from a user, a selection of at least one document from the directory, the document being stored in a first format;
    transmitting to the remote device a third electronic mail message containing a request for the selected at least one document; and
    receiving from the remote device a fourth electronic mail message containing the requested at least one stored document in a print-ready format.

23. A computer-implemented method for remotely selecting and retrieving an electronic document, comprising:
    receiving, from a first device, a request for a directory;
    transmitting to a second device a first electronic mail message containing the received request;
    receiving from the second device a second electronic mail message containing the requested directory describing a plurality of stored documents;
    transmitting the received directory to the first device;
    receiving, from the first device, a selection of at least one document from the directory, the document being stored in a first format;
    transmitting to the second device a third electronic mail message containing a request for the selected at least one document;
    receiving from the second device a fourth electronic mail message containing the requested at least one stored document in a print-ready format; and
    transmitting, to the first device, the requested at least one stored document in the print-ready format.

24. The method of claim 23, wherein:
    the first device comprises a personal digital assistant.

25. The method of claim 23, wherein:
    the first device comprises a handheld computer.

26. The method of claim 23, wherein:
    receiving the request for a directory comprises receiving the request via wireless communication;
    transmitting the received directory to the first device comprises transmitting the received directory via wireless communication;
    receiving the selection of at least one document from the directory comprises receiving the selection via wireless communication; and
    transmitting, to the first device, the requested at least one stored document comprises transmitting the requested at least one stored document via wireless communication.

27. A computer-implemented method for remotely selecting and retrieving an electronic document, comprising:
    at a first device, receiving from a user a request for a directory;
    transmitting to a second device a first electronic mail message containing the directory request;
    transmitting to the first device a second electronic mail message containing the requested directory describing a plurality of documents stored at the second device;
    displaying at least a portion of the received directory;
    at the first device, receiving from the user a selection of at least one of the stored documents;
    transmitting to the second device a third electronic mail message containing a request for the selected at least one document; and
    at the second device, rendering the requested at least one stored document in a print-ready format; and
    after the at least one stored document has been rendered in a print-ready format, transmitting to the first device a fourth electronic mail message containing the requested at least one stored document in the print-ready format.

28. The method of claim 27, further comprising:
    routing the directory request to a server having a cache; and
    retrieving the directory from the cache;
    and wherein transmitting the second electronic mail message comprises:
    transmitting the second electronic mail message from the server to the first device.

29. The method of claim 27, further comprising:
    routing the directory request to a server having a cache;
    determining whether the cache contains the directory; and
    responsive to the cache containing the directory, retrieving the directory from the cache;
    and wherein transmitting the second electronic mail message comprises:

responsive to the cache containing the directory, transmitting the second electronic mail message from the server to the first device; and responsive to the cache not containing the directory, transmitting the second electronic mail message from the second device to the first device.

30. The method of claim 27, further comprising:

after rendering the requested at least one stored document in a print-ready format, transmitting the rendered at least one document to an intermediate server;

wherein transmitting the fourth electronic mail message comprises transmitting the fourth electronic mail message from the intermediate server to the first device.

31. A computer-implemented method for remotely selecting and retrieving an electronic document, comprising:

at a first device having a cache, receiving from a user a request for a directory;

determining whether the cache contains the requested directory;

responsive to the cache not containing the requested directory:

transmitting to a second device a first electronic mail message containing the directory request; and transmitting to the first device a second electronic mail message containing the requested directory describing a plurality of documents stored at the second device;

displaying at least a portion of the requested directory;

at the first device, receiving from the user a selection of at least one of the stored documents, the document being stored in a first format;

transmitting to the second device a third electronic mail message containing a request for the selected at least one document; and transmitting to the first device a fourth electronic mail message containing the requested at least one stored document in a print-ready format.

32. A computer-implemented method for remotely selecting and printing an electronic document, comprising:

receiving, from a user, a request for a directory;

transmitting to a remote device a first electronic mail message containing the received request;

receiving from the remote device a second electronic mail message containing the requested directory describing a plurality of stored documents and their relationship to each other;

displaying at least a portion of the received directory;

receiving, from a user, a selection of at least one document from the directory, the document being stored in a first format;

transmitting to the remote device a third electronic mail message containing a request for the selected at least one document;

receiving from the remote device a fourth electronic mail message containing the requested at least one stored document in a print-ready format; and printing the requested at least one stored document in a second format.

33. A system for remotely selecting and retrieving an electronic document, comprising:

a storage device, for storing a plurality of documents organized in at least one directory;

an inbound electronic mail processing module, coupled to a first device, for receiving from a remote device a first electronic mail message containing a request for a directory of the storage device including documents and their relationship to each other;

an electronic mail transmission module, coupled to the inbound electronic mail processing module and to the storage device, for, responsive to the received first message, transmitting to the remote device a second electronic mail message containing a directory listing at least a subset of the documents stored in the storage device; and a document rendering module, coupled to the electronic mail transmission module; and wherein:

the inbound electronic mail processing module further receives from the remote device a third electronic mail message containing a request for at least one of the stored documents; and responsive to the received third message, the rendering module renders the requested at least one stored document in a print-ready format, and the electronic mail transmission module subsequently transmits to the remote device a fourth electronic mail message containing the requested at least one stored document in the print-ready format.

34. The system of claim 33, wherein the remote device comprises one selected from the group consisting of:

a personal computer;

a printer;

a fax machine; and a multifunction device.

35. The system of claim 33, wherein:

the inbound electronic mail processing module receives the first and third electronic mail messages across a firewall; and the electronic mail transmission module transmits the second and fourth electronic mail messages across a firewall.

36. The system of claim 33, wherein the storage device comprises a hard drive.

37. The system of claim 33, further comprising:

an authentication module, coupled to the inbound electronic mail processing module, for, prior to the electronic mail transmission module transmitting the second electronic mail message, authenticating a user initiating the directory request.

38. The system of claim 33, further comprising:

an authentication module, coupled to the inbound electronic mail processing module, for, prior to the electronic mail transmission module transmitting the fourth electronic mail message, authenticating a user initiating the document request.

39. The system of claim 33, wherein:

the electronic mail transmission module comprises an encryption module, for encrypting the directory; and the second electronic mail message comprises the encrypted directory.

40. The system of claim 33, wherein:

the electronic mail transmission module comprises an encryption module, for encrypting the requested at least one stored document; and the fourth electronic mail message comprises the encrypted at least one stored document.

41. The system of claim 33, wherein the second electronic mail message further contains meta-information describing at least one of the stored documents.

42. A system for remotely selecting and retrieving an electronic document, comprising:

a storage device, for storing a plurality of documents organized in at least one directory;

an inbound electronic mail processing module, coupled to a first device, for receiving from a remote device a first electronic mail message containing a search request;

a search module, coupled to the storage device and to the inbound electronic mail processing module, for, responsive to the received first message, performing the requested search on a set of stored documents to obtain a list of at least one search result;

an electronic mail transmission module, coupled to the search module, for transmitting to the remote device a second electronic mail message containing the obtained list; and a document rendering module, coupled to the electronic mail transmission module; and wherein:

the inbound electronic mail processing module further receives from the remote device a third electronic mail message containing a request for at least one of the stored documents; and responsive to the received third message, the rendering module renders the requested at least one stored document in a print-ready format, and the electronic mail transmission module subsequently transmits to the remote device a fourth electronic mail message containing the requested at least one stored document in the print-ready format.

43. A system for remotely selecting and retrieving an electronic document, comprising:

an input device, for receiving, from a user, a request for a directory;

an electronic mail transmission module, coupled to the input device, for transmitting to a remote device a first electronic mail message containing the received request;

an inbound electronic mail processing module, for receiving from the remote device a second electronic mail message containing the requested directory describing a plurality of stored documents and their relationship to each other; and a display, coupled to the inbound electronic mail processing module, for displaying at least a portion of the received directory;

wherein:

the input device further receives, from the user, a selection of at least one document from the directory, the document being stored in a first format;

the electronic mail transmission module transmits to the remote device a third electronic mail message containing a request for the selected at least one document; and the inbound electronic mail processing module receives from the remote device a fourth electronic mail message containing the requested at least one stored document in a print-ready format.

44. The system of claim 43, wherein the remote device comprises a personal computer.

45. The system of claim 43, wherein:

the electronic mail transmission module transmits the first and third electronic mail messages across a firewall; and the inbound electronic mail processing module receives the second and fourth electronic mail messages across a firewall.

46. The system of claim 43, wherein the input device receives, from the user, authentication information, the system further comprising:

an authentication module, coupled to the input device, for authenticating the user based on the received authentication information.

47. The system of claim 43, wherein:

the input device receives, from the user, authentication information; and the electronic mail transmission module transmits, to the remote device, the received authentication information.

48. The system of claim 43, wherein the second electronic mail message contains the requested directory in an encrypted form, the system further comprising:

a decryption module, coupled to the inbound electronic mail processing module, for decrypting the encrypted directory.

49. The system of claim 43, wherein the fourth electronic mail message contains the at least one document in an encrypted form, the system further comprising:

a decryption module, coupled to the inbound electronic mail processing module, for decrypting the encrypted at least one document.

50. The system of claim 43, wherein the second electronic mail message further contains meta-information describing at least one of the stored documents, and wherein:

the display displays at least a portion of the meta-information.

51. The system of claim 43, wherein:

the input device further receives, from the user, a navigation command further comprising, after displaying at least a portion of the received directory; and responsive to the navigation command, the display displays at least a second portion of the received directory.

52. A system for remotely selecting and retrieving an electronic document, comprising:

an input device, for receiving, from a user, a search request;

an electronic mail transmission module, coupled to the input device, for transmitting to a remote device a first electronic mail message containing the received search request;

an inbound electronic mail processing module, for receiving from the remote device a second electronic mail message containing a list of at least one search result; and a display, coupled to the inbound electronic mail processing module, for displaying at least a portion of the received list;

wherein:

the input device receives, from the user, a selection of at least one document from the list, the document being stored in a first format;

the electronic mail transmission module transmits to the remote device a third electronic mail message containing a request for the selected at least one document; and the inbound electronic mail processing module receives from the remote device a fourth electronic mail message containing the requested at least one stored document in a print-ready format.

53. A system for remotely selecting and retrieving an electronic document, comprising:

an input device, for receiving, from a user, a request for a directory;

a cache, for, storing at least one directory, and for, responsive to data describing the requested directory being available in the cache, providing the requested directory describing a plurality of stored documents;

an electronic mail transmission module, coupled to the cache, for responsive to data describing the requested directory not being available in a cache, transmitting to a remote device a first electronic mail message containing the received request;

an inbound electronic mail processing module, for, responsive to data describing the requested directory not being available in a cache, receiving from the remote device a second electronic mail message containing the requested directory describing a plurality of stored documents; and a display, coupled to the cache and to the inbound electronic mail processing module, for displaying at least a portion of the directory;

wherein:

the input device receives, from the user, a selection of at least one document from the directory, the document being stored in a first format;

the electronic mail transmission module transmits to the remote device a third electronic mail message containing a request for the selected at least one document; and the inbound electronic mail processing module receives from the remote device a fourth electronic mail message containing the requested at least one stored document in a print-ready format.

54. A system for remotely selecting and retrieving an electronic document, comprising:

an inbound electronic mail processing module, for receiving, from a first device, a request for a directory; and an electronic mail transmission module, coupled to the inbound electronic mail processing module, for transmitting to a second device a first electronic mail message containing the received request;

wherein:

the inbound electronic mail processing module receives from the second device a second electronic mail message containing the requested directory describing a plurality of stored documents;

the electronic mail transmission module transmits the received directory to the first device;

the inbound electronic mail processing module receives, from the first device, a selection of at least one document from the directory, the document being stored in a first format;

the electronic mail transmission module transmits to the second device a third electronic mail message containing a request for the selected at least one document;

the inbound electronic mail processing module receives, from the second device a fourth electronic mail message containing the requested at least one stored document in a print-ready format; and the electronic mail transmission module transmits, to the first device, the requested at least one stored document in the print-ready format.

55. The system of claim 54, wherein:
the first device comprises a personal digital assistant.

56. The system of claim 54, wherein:
the first device comprises a handheld computer.

57. The system of claim 54, wherein:
the inbound electronic mail processing module receives the request for a directory and the selection of at least one document from the directory via wireless communications; and the electronic mail transmission module transmits the received directory and the requested at least one stored document via wireless communication.

58. A system for remotely selecting and retrieving an electronic document, comprising:
a first device, comprising:

an input device, for receiving from a user a request for a directory; and an electronic mail transmission module, coupled to the input device, for transmitting a first electronic mail message containing the directory request; and a second device, comprising:

a storage device, for storing a plurality of documents;

an inbound electronic mail processing module, for receiving, from the first device, the first electronic mail message;

an electronic mail transmission module, coupled to the inbound electronic mail processing module and to the storage device, for transmitting to the first device a second electronic mail message containing the requested directory describing a plurality of documents stored at the second device; and a document rendering module, coupled to the electronic mail transmission module;

wherein the first device further comprises:

an inbound electronic mail processing module, for receiving, from the second device, the second electronic mail message; and a display, coupled to the inbound electronic mail processing module, for displaying at least a portion of the received directory;

and wherein:

the input device further receives from the user a selection of at least one of the stored documents;

the electronic mail transmission module of the first device transmits to the second device a third electronic mail message containing a request for the selected at least one document;

the document rendering module renders the requested at least one stored document in a print-ready format; and after the at least one stored document has been rendered in a print-ready format, the electronic mail transmission module of the second device transmits a fourth electronic mail message containing the requested at least one stored document in the print-ready format.

59. The system of claim 58, further comprising:
a server having a cache for storing a directory;
wherein the second device requests the directory from the server, and wherein the server responds to the request by transmitting the directory.

60. The system of claim 58, further comprising:
a server having a cache for storing a directory;
wherein the second device requests the directory from the server,
wherein the server determines whether the cache contains the directory, and, responsive to the cache containing the directory, retrieves the directory from the cache and transmits the directory;
and wherein, responsive to the cache not containing the directory, the second device transmits the second electronic mail message to the first device.

61. A system for remotely selecting and retrieving an electronic document, comprising:
a first device, comprising:

an input device, for receiving from a user a request for a directory;

a cache, for selectively storing directories;

an electronic mail transmission module, coupled to the input device and to the cache, for, responsive to the cache not containing the requested directory, transmitting a first electronic mail message containing the directory request; and a second device, comprising:

a storage device, for storing a plurality of documents;

an inbound electronic mail processing module, for receiving, from the first device, the first electronic mail message; and an electronic mail transmission module, coupled to the inbound electronic mail processing module and to the storage device, for transmitting to the first device a second electronic mail message containing the requested directory describing a plurality of documents stored at the second device;

wherein the first device further comprises:

an inbound electronic mail processing module, for receiving, from the second device, the second electronic mail message; and a display, coupled to the inbound electronic mail processing module, for displaying at least a portion of the received directory;

and wherein:

the input device further receives from the user a selection of at least one of the stored documents;

the electronic mail transmission module of the first device transmits to the second device a third electronic mail message containing a request for the selected at least one document, the document being stored in a first format; and the electronic mail transmission module of the second device transmits a fourth electronic mail message containing the requested at least one stored document in a print-ready format.

62. A system for remotely selecting and printing an electronic document, comprising:

an input device, for receiving from a user a request for a directory; and an electronic mail transmission module, coupled to the input device, for transmitting to a remote device a first electronic mail message containing the directory request; and an inbound electronic mail processing module, coupled to the electronic mail transmission module, for receiving from the remote device a second electronic mail message containing the requested directory describing a plurality of stored documents and their relationship to each other; and a display, coupled to the inbound electronic mail processing module, for displaying at least a portion of the received directory;

wherein:

the input device receives, from the user, a selection of at least one document from the directory, the document being stored in a first format;

the electronic mail transmission module transmits to the remote device a third electronic mail message containing a request for the selected at least one document; and the inbound electronic mail processing module receives from the remote device a fourth electronic mail message containing the requested at least one stored document in a print-ready format;

and wherein the system further comprises a printer, coupled to the inbound electronic mail processing module, for printing the requested at least one stored document.

* * * * *